(12) United States Patent
Buddhikot et al.

(10) Patent No.: US 7,499,401 B2
(45) Date of Patent: Mar. 3, 2009

(54) INTEGRATED WEB CACHE

(75) Inventors: Milind M. Buddhikot, Cliffwood, NJ (US); Girish P. Chandranmenon, Edison, NJ (US); Seung-Jae Han, Basking Ridge, NJ (US); Yui-Wah Lee, Freehold, NJ (US); Scott C. Miller, Freehold, NJ (US); Luca Salgarelli, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 938 days.

(21) Appl. No.: 10/689,168

(22) Filed: Oct. 20, 2003

(65) Prior Publication Data

US 2004/0087304 A1 May 6, 2004

Related U.S. Application Data

(60) Provisional application No. 60/420,054, filed on Oct. 21, 2002.

(51) Int. Cl.
*H04J 1/16* (2006.01)
(52) U.S. Cl. .............. 370/235; 370/338; 370/342; 370/401; 370/469; 455/433
(58) Field of Classification Search .......... 370/338, 370/443, 310; 455/433
See application file for complete search history.

(56) References Cited

U.S. PATENT DOCUMENTS

| | | | |
|---|---|---|---|
| 6,317,028 B1 | 11/2001 | Valius | |
| 6,345,043 B1 | 2/2002 | Hsu | |
| 6,680,923 B1 | 1/2004 | Leon | |
| 6,954,790 B2 * | 10/2005 | Forslow | 709/227 |
| 2001/0048744 A1 | 12/2001 | Kimura | |
| 2003/0202505 A1 * | 10/2003 | Ozugur | 370/352 |
| 2005/0213545 A1 * | 9/2005 | Choyi et al. | 370/338 |

OTHER PUBLICATIONS

Bhagwat, Pravin, Perkin, Charles, and Tripathi, Satish, "Network Layer Mobility: An Architecture and Survey," IEEE Personal Commmunicationss, 11 pages, Jun. 1996.
Braun, et al., "A Linux Implementation of a Differentiated Services Router," Institute of Computer Science and Applied Mathematics, University of Berne, 12 pages.
Dornan, Andy, "CDMA and 3G Cellular Networks," www.networkmagazine.com/article/NMG.html20000831S0006.html., 4 pages, visited Mar. 31, 2003.
Hayes, Vic., Chair IEEE P802.11 (Sep. 1990), Lucent Technologies, Tutorial on 802.11 to 802, doc.: IEEE P802.11-96/49A Rev. 1 to 49E, 70 pages, Mar. 1996.
© 1999 Microsoft Corporation, Microsoft Windows 2000 Server, Operating System, "Virtual Private Networking in Windows 2000: An Overview," White Paper, 24 pages.
C. Perkins, Editor, Network Working Group, Request for Comments: 2002, Category: Standards Track, "IP Mobility Support," IBM, www.ietf.org/rfc/rfc2002.txt.html, 32 pp. Oct. 1996.

* cited by examiner

*Primary Examiner*—Seema S Rao
*Assistant Examiner*—Wanda Z Russell

(57) ABSTRACT

A gateway for mobile communications comprises a cache for storing network data recently downloaded from a network, a foreign agent, and a packet filter that directs requests for the network data from a mobile node to the cache. The packet filter directs the requested network data from the cache to the mobile node by way of the foreign agent, without forwarding the requested network data to a home agent of the mobile node.

19 Claims, 15 Drawing Sheets

100

INTEGRATED WEB CACHE

This application claims the benefit of U.S. Provisional Patent Application No. 60/420,054, filed Oct. 21, 2002.

FIELD OF THE INVENTION

The present invention relates generally to the field of wireless devices, and more specifically to integration of mobility access functions in a gateway.

BACKGROUND

Recent trends indicate that local area wireless networks based on IEEE 802.11 standards and third-generation wide area wireless networks such as code division multiple access 2000 (CDMA2000) and universal mobile telecommunications system (UMTS) will co-exist to offer Internet access to end users. The two technologies offer characteristics that complement each other. The 802.11 standards allow the realization of economical Wireless LANs that support data rates anywhere from about 1 Mbps to about 54 Mbps based on the distance to the base station (often called Access Points). However, 802.11 Access Points can cover areas of only a few thousand square meters, making them suitable for enterprise networks and public hot-spots such as hotels and airports. On the other hand, wireless networks built using the 3G standards require significant capital investments, support limited peak rates that range from 64 Kbps to nearly 2 Mbps as a maximum, but offer a much wider area of coverage that enables ubiquitous connectivity. The deployment of architectures that allow users to seamlessly switch between these two types of network would present several advantages to both service providers and users. By offering integrated 802.11/3G services, 3G operators and Wireless Internet Service Providers (WISP) could capitalize on their investments, attract a wider user base and ultimately facilitate the ubiquitous introduction of high-speed wireless data. Users would benefit from the enhanced performance and lower overall cost of such a combined service.

The design of a network architecture that efficiently integrates 3G and 802.11 is a challenging task, particularly when an objective is to make the interoperation between the two technologies as seamless and as efficient as possible, both from the end-user's and from the operator's perspectives. Wireless LANs, originally targeted at enterprise and home networks, lack many of the capabilities which are essential in public environments. These capabilities include unified and universally accepted authentication, accounting and billing mechanisms; the integration of mobility mechanisms with QoS and application-level services; the support for heterogeneous network architectures through the implementation of roaming agreements. Conversely, although these characteristics are present by design in 3G networks, their implementation depends on specific wireless access architectures such as CDMA2000 or UMTS and their extension to other wireless technologies such as 802.11 presents several compatibility issues. Depending on the level of inter-dependence that one is willing to introduce between 802.11 and 3G, the design of integrated multi-technology wireless systems can lead to network architectures that have fundamentally different properties.

In 802.11 networks, Access Points (AP) bridge the wireless and wired parts of the network. However, the current 802.11 protocol suite only defines the physical and media access control layers but not the layers above. There are three implications of this. First, authentication procedures vary from provider to provider, depending on the particular architecture and set of authentication protocols that they decide to deploy. Second, existing standards do not define the characteristics of the services offered to users, for example with respect to QoS guarantees. Finally, there is currently no agreed upon mobility-management mechanism that would allow users to seamlessly roam across different 802.11 networks managed by different providers.

In 3G networks, Base Stations (BS) together with Radio Network Controllers (RNC) bridge the wireless and wired network. There are two dominating 3G standard suites—CDMA2000 and UMTS. In the case of CDMS2000, the Packet Control Function (PCF) and Packet Data Service Nodes (PDSN) channel data packets to the Internet through the provider's core network. In the case of UMTS, the Serving and Gateway GPRS Service Nodes (SGSN and GGSN) provide logically similar functionalities. Unlike 802.11, 3G standards cover also the layers above the media access, so protocols that deal with authentication procedures, QoS guarantees, and mobility management are standardized. Users are guaranteed that they can seamlessly roam across 3G networks owned by different providers, assuming that they share a roaming agreement.

Ala-Laurila et al., "Wireless Lan Access Network Architecture for Mobile Operators". IEEE Communications Magazine, pp 82-89, November 2001, proposed a solution that combines GSM/GPRs subscriber management and billing mechanisms with 802.11 access technology. They assume user terminals (laptops or PDAs) are equipped with GSM SIM readers and use authentication procedures similar to those in GSM/GPRS networks. They use a special protocol called NAAP that runs on top of UDP/IP to transport authentication messages. They do not study the use and implication of dual-interface (GSM/GPRS and 802.11) terminal. Therefore, their system supports roaming but does not support seamless hand-off that preserves on-going sessions between the two networks. If the two networks use two different access technologies, the user has to manually configure the terminal to use a different network interface. Finally, their system does not provide QoS guarantees in 802.11 access network and also, does not optimize web delivery over mobile-IP sessions.

J. H. Park, "Wireless Internet Access for Mobile Subscribers Based on the GRPS/IUMTS Network", IEEE Communications Magazine, pp 38-49, April 2002, studied how ISP subscribers visiting a foreign GPRS/UMTS network can authenticate themselves and use the GPRS/UMTS network. This work focuses on the case where the home network (and the AAA infrastructure) is an ISP network and the access network is a GPRS/UMTS network. Park also studied deployment of mobile-IP in their context.

Weinstein et al., "Wireless Lan and Cellular Mobile—Competition and Cooperation", IEEE Micro Magazine, to appear, proposed a scenario where 802.11 access networks complement rather than compete with cellular access networks. They noticed the importance of dual-mode radios and coordinated AAA, but they do not address the issue of seamless inter-technology hand-off.

Brustoloni et al., Microisps: Providing Convenient and Low-Cost High-Bandwidth Internet Access", Computer Networks, 33(1-6): pp 789-802, 2000, proposed an architecture called microISP for hot-spot operators offering service in airports, hotels, etc. In their architecture, an operator leases a high-speed back-haul link to a conventional ISP, and provide high-speed Internet access to transient users using 802.11 access network. In their case, there is no notion of roaming agreement, and the users are expected to settle payment individually for each session.

An improved system for integrating 3G and 802.11 access is desired.

SUMMARY OF THE INVENTION

A gateway for mobile communications comprises a cache for storing network data recently downloaded from a network, a foreign agent, and a packet filter that directs requests for the network data from a mobile node to the cache. The packet filter directs the requested network data from the cache to the mobile node by way of the foreign agent, without forwarding the requested network data to a home agent of the mobile node.

BRIEF DESCRIPTION OF THE DRAWINGS

A more complete understanding of the invention may be obtained from consideration of the following detailed description of the invention in conjunction with the drawing, with like elements referenced with like reference numerals, in which.

DETAILED DESCRIPTION

Figure 1:
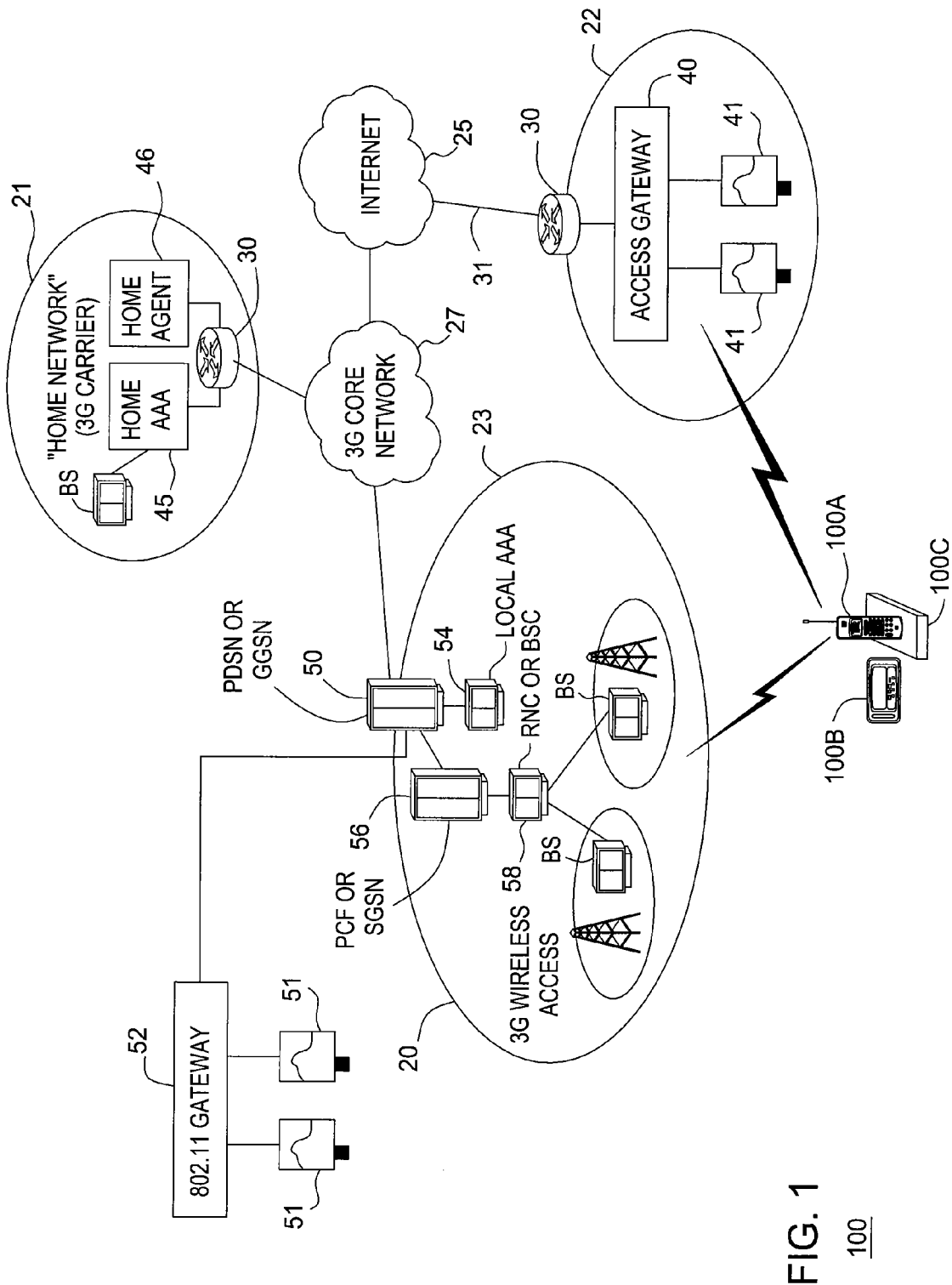
FIG. 1 is a network architecture diagram showing tight and loose 3G and 802.11 integration employing aspects of the invention.

U.S. Provisional Patent Application No. 60/420,054, filed Oct. 21, 2002, is incorporated by reference herein in its entirety, as though set forth fully herein.

Consider an example of a preferred service scenario. A user has a laptop/handheld that has both a 3G and an 802.11 interface. The 802.11 service that many airports offer is appealing, because of the high bandwidth the user could enjoy. However, given that 802.11 can offer only spot coverage, the user would need to sign-up with many 802.11 providers in order to receive service in the places visited. Furthermore, the user would need to manually setup and teardown his wireless connection as he travels from one place to the other. The user is therefore attracted by the ubiquitous coverage of 3G, and thus decides to sign up with a 3G carrier, which, in turn, has roaming agreements with many 802.11 service providers. When the user travels to a place, such as an airport concourse, where there is such an 802.11 service provider, his machine should be able to transparently switch to the 802.11 access. When the user leaves the coverage of the 802.11 provider, his machine should seamlessly switch to the 3G access.

There are several issues to be addressed. First, as a subscriber of the 3G carrier, the user's machine is configured with a security association (a user identity and a secret key) with the carrier. However, prior to the user trying to access the 802.11 network, the 802.11 provider does not know anything about the user. Therefore, the 802.11 provider desires a secure mechanism through which it can authenticate the user by interacting with the Authentication, Authorization and Accounting (AAA) server of the 3G carrier. Second, when the switching occurs, the user may have several ongoing network sessions (e.g., network radio, voice chat. etc), and these sessions should be transparently maintained. Third, as a related point, the switching should happen automatically and transparently without the user's intervention. Fourth, the 802.11 provider should be able to honor the service level, such as QoS guarantees, that the carrier has agreed to provide to the user, while enforcing the policies that the user's contract with the 3G carrier foresees. To satisfy these objectives of this preferred embodiment, this means that the 802.11 provider has to obtain the user's user profile from the carrier infrastructure (most likely the AAA server) and be able to map the local service characteristics to the desired service described in the profile. Finally, in this preferred embodiment, the accounting and billing infrastructures of the 3G carrier and the 802.11 provider is interfaced to enable periodic revenue sharing and settlement and to allow the 3G carrier to generate a common bill to the customer. Typically, the last two issues are addressed by establishing roaming agreements between the providers and therefore, efficient mechanisms are provided to set up the same.

The exemplary embodiments described herein address the problems of integration of third generation (3G) wide area wireless networks and 802.11 local area networks to offer seamless connectivity across the two networks. One embodiment comprises two components: a new network element herein referred to as the Gateway 40, deployed in 802.11 networks, and client software operating in a mobile node (MN) 100a-100c. The Gateway 40 is preferably composed of functional modules selectively implemented in software and/or hardware, and with cooperation from the client offers integrated 802.11/3G wireless data services that support seamless inter-technology mobility, Quality of Service (QoS) guarantees and multi-provider roaming agreements. The design and implementation of an embodiment of the Gateway 40 and the client software are described along with experimental performance results.

Depending on the degree of inter-dependence that one is willing to introduce between the 3G network 27 and an 802.11 network, there are two methods of integrating the two wireless technologies. The methods are defined herein as tightly-coupled interworking and loosely-coupling interworking.

FIG. 1 shows a heterogenous network including a conventional 3G network 27, a conventional gateway 52 to connect 802.11 access points 51 to the 3G network, and an exemplary Gateway 40 in accordance with an embodiment of the invention.

Tightly-coupled Interworking

The tightly coupled approach is shown by 802.11 gateway 52. The rationale behind the tightly-coupled approach is to make the 802.11 network 52 appear to the 3G core network 27 as another 3G access network. The 802.11 network 52 would then emulate functions which are natively available in 3G radio access networks. In this architecture, utilized by 802.11 gateway 52 in FIG. 1, the "802.11 gateway" network element 52 appears to the upstream 3G core 27 as either a packet control function (PCF), in the case of a CDMA2000 core network, or as a serving and gateway GPRS service node (SGSN), in the case of a universal mobile telecommunications system (UMTS). The 802.11 gateway 52 hides the details of the 802.11 network from the 3G core 27, and implements all the 3G protocols (mobility management, authentication, etc.) required in a 3G radio access network. Mobile Nodes in this approach are required to implement the corresponding 3G protocol stack on top of their standard 802.11 network cards, and switch from one physical layer to the next as needed. All the traffic generated by clients 100a-100c in the 802.11 network 52 is injected using 3G protocols in the 3G core 27. The different networks would share the same authentication, signaling, transport and billing infrastructures, independently from the protocols used at the physical layer on the radio interface.

However, this approach presents several disadvantages. Since the 3G core network 27 directly exposes its interfaces to the 802.11 network, the same operator must own both the 802.11 part 52 and the 3G parts of the network 27. In fact, in this case, independently operated 802.11 islands could not be integrated with 3G networks. Today's 3G networks are deployed using carefully engineered network-planning tools, and the capacity and configuration of each network element is calculated using mechanisms which are very much specific to the technology utilized over the air interface. By injecting the 802.11 traffic directly into the 3G core 27, the setup of the entire network, as well as the configuration and the design of network elements such as PDSNs and GGSNs have to be modified to sustain the increased load.

The configuration of the client devices 100a-100c also presents several issues with this approach. First, as described above, the 802.11 network cards in MNs 100a-100c would need to implement the 3G protocol stack. It would also mandate the use of 3G-specific authentication mechanisms based on Universal Subscriber Identity Module or Removable User Identity Module (R-UIM) cards for authentication on Wireless LANs, forcing 802.11 providers to interconnect to the 3G carriers' SS7 network to perform authentication procedures. This would also imply the use of 802.11 network interface cards with built-in USIM or R-UIM slots or external cards plugged separately into the subscriber devices.

For the reasons described above, the complexity and the high cost of the reconfiguration of the 3G core networks 27 and of the 802.11 gateways 52 would force operators that chose the tightly-coupled approach to become uncompetitive to 802.11-only WISPs.

Loosely-Coupled Interworking

Like the tightly coupled architecture, the loosely-coupled approach of the present invention calls for the introduction of a new element in the 802.11 network, the 802.11 gateway. However, in this embodiment (gateway 40 in FIG. 1), the gateway 40 connects to the Internet 25 and preferably does not have a direct link to 3G network elements such as PDSNs 50, GGSNs or switches of 3G core network 27. The user population that accesses services of the 802.11 gateway 40 preferably includes users that have locally signed on, as well as mobile users visiting from other networks. This approach is referred to as loosely-coupled internetworking because it separates the data paths in 802.11 and 3G networks. The high speed 802.11 data traffic is preferably not injected into the 3G core network 27 but the end user still achieves seamless access.

In this approach, different mechanisms and protocols can handle authentication, billing and mobility management in the 3G and 802.11 portions of the network. However, for seamless operation to be possible, they have to interoperate. In the case of interoperation with CDMA2000, the 802.11 gateway 40 supports Mobile-IP functionalities to handle mobility across networks, as well as AAA services to internetwork with the 3G's home network AAA servers 45. This enables the 3G provider to collect the 802.11 accounting records and generate a unified billing statement indicating usage and various price schemes for both (3G and 802.11) networks. At the same time, the use of compatible AAA services on the two networks would allow the 802.11 gateway 40 to dynamically obtain per-user service policies from their Home AAA servers, and to enforce and adapt such policies to the 802.11 network.

Since the universal mobile telecommunications system (UMTS) standards do not yet include support for IETF protocols such as AAA and Mobile-IP, more adaptation is preferably provided to integrate with UMTS networks. Mobile-IP services are preferably retrofitted to the GGSNs 50 to enable seamless mobility between 802.11 and UMTS. Common subscriber databases preferably interface with Home Location Registers (HLR) for authentication and billing on the UMTS side of the network, and to AAA servers for the same operations to be performed while clients roam to 802.11 networks.

There are several advantages to the loosely-coupled integration approach described herein. First, it allows the independent deployment and traffic engineering of 802.11 and 3G networks. 3G carriers can benefit from other providers' 802.11 deployments without extensive capital investments. At the same time, they can continue to deploy 3G networks using well-established engineering techniques and tools. Furthermore, while roaming agreements with many partners can result in widespread coverage, including key hot-spot areas, subscribers benefit from having just one service provider for all network access. They no longer need to establish separate accounts with providers in different regions, or covering different access technologies. Finally, unlike the tightly-coupled approach, this architecture allows a WISP to provide its own public 802.11 hot-spot, interoperate through roaming agreements with public 802.11 and 3G service providers, or manage a privately installed enterprise Wireless LAN.

Using the framework provided by the loosely-coupled architecture described above, a gateway system 40 is provided (see FIG. 2). Each gateway system 40 preferably serves multiple 802.11 access points 41 in a hot-spot, and controls the traffic from these APs 41 before it can reach the back-haul link 31. Although FIG. 1 shows the access points 41 directly connected to the gateway 40, an access point can be indirectly connected to the gateway by way of an Ethernet switch or hub, or other local area network (LAN) switch or hub. FIG. 1 shows gateway 40 connected to the internet by way of an edge router 30. This link may be a network layer (layer 3) connection between a router in the gateway 40 (not shown in FIG. 1) or a layer 2 connection using, for example, Ethernet or packet over SONET.

Figure 2:
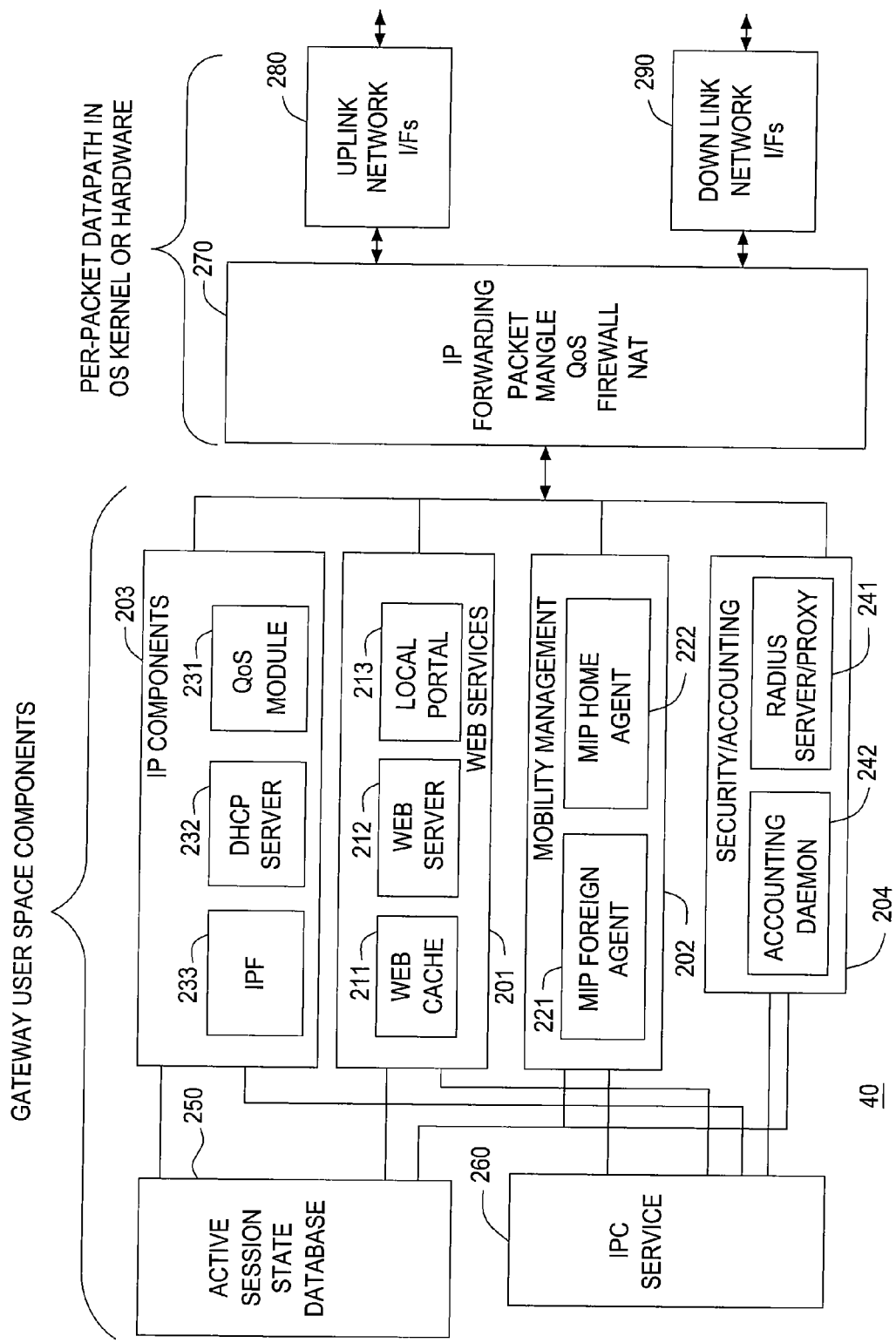
FIG. 2 is a component diagram showing the software architecture of one embodiment of the present invention.

A mobile node 100a-100c that roams into a hot-spot 22 preferably obtains 802.11 access under the control of the gateway 40. After successful authentication and Mobile-IP registration, the gateway 40 allows the mobile node 100a-100c to access the network (Internet 25, and possibly, core network 27). The gateway 40 also preferably provides QoS services and collects accounting data. The gateway 40 also preferably integrates a number of optional sub-systems, as shown in FIG. 2, including: web cache 211, web server 212, local portal 213, Mobile IP foreign agent 221, Mobile-IP home agent 222, QoS module 231, DHCP server 232, Internet Protocol filter 233, RADIUS server 241, accounting daemon 242, and dynamic firewall 270. All the Gateway 40 subsystems preferably include a persistent, non-volatile (e.g., on-disk) database 250 to store information about each client's session. Thus, the state of the gateway 40 can be preserved and restored even in the event of a system reboot, making the gateway fault tolerant. The database 250 stores information that has already been processed, such as rules and address information. An EPC service 260 provides interprocess communications among all of the various modules 211, 212, 213, 221, 222, 231, 232, 233, 241, 242.

In a representative implementation or exemplary embodiment of the gateway 40, components of the gateway are implemented as software modules, and run on top of the Linux Operating System. The design of the gateway software allows it to be scalable, so that it could be implemented on hardware of varying power, depending on the size of the 802.11 network. Furthermore, the design allows for a very inexpensive solution by not requiring custom-built hardware. Gateways according to embodiments of the present invention can preferably be implemented in off-the-shelf rack-mountable PC servers.

RADIUS (Remote Authentication Dial-In User Service) Server 204

A preferred gateway embodiment according to the present invention contains a complete RADIUS AAA server 204. The server 204 enables roaming agreements between the 3G providers and 802.11 WISP, and also provides authentication services to the 802.11 cloud.

Figure 5:
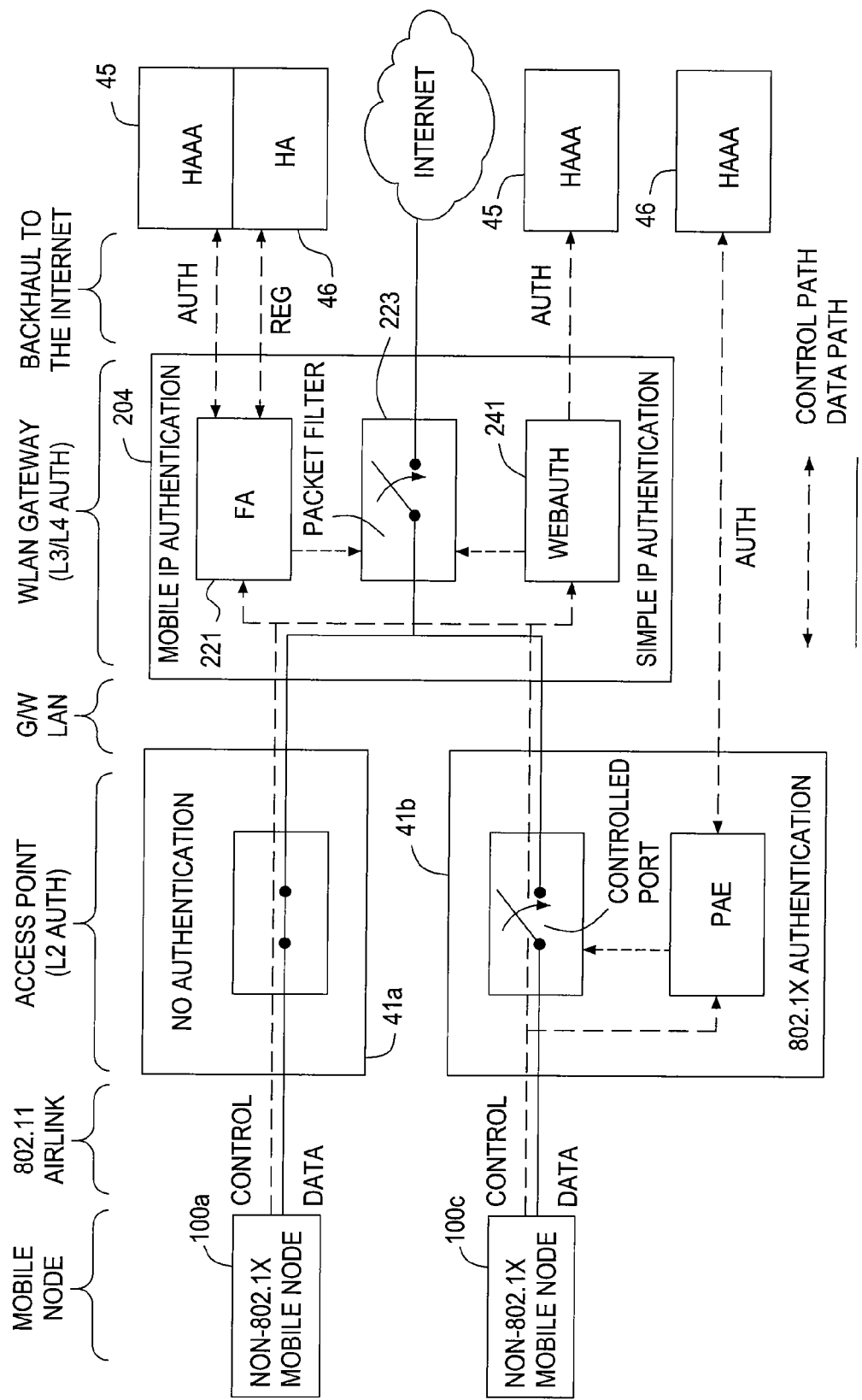
FIG. 5 is a block diagram of an accounting subsystem that may be used in some embodiments of the present invention.

The server 204 can be used to authenticate clients in two different ways, best understood with reference to FIG. 5. For Wireless LANs 41*b* that implement the 802.1X port-access control protocol, and that use the Extensible Authentication Protocol (EAP) to transfer authentication information between the client 100*c* and the network 21, the AAA server 204 functions as an EAP relay. In this mode, it passes authentication information between the 802.11 APs 41*b* and the client's Home AAA server 45. The server 241 preferably supports IETF standardized EAP methods such as TLS, MD5, One Time Password (OTP), as well as legacy authentication methods such as PAP and CHAP. In addition, it also preferably implements novel authentication mechanisms such as the Shared Key Exchange which has been highly optimized for the support of roaming clients in wireless networks.

For Wireless LANs 41*a* that do not implement 802.1X, the AAA server 204 interacts with the Mobile-IP Foreign Agent module 221 to authenticate the client with its Home AAA server 45 based on the Mobile-IP mechanisms specified.

In both cases, the presence of the AAA server 204 on the gateway 40 allows for an easy implementation of per-user policies. In fact, being on the path of the authentication exchange, the AAA server 204 can obtain user profiles from their Home AAA server 45, and pass them on to the other modules of gateway 40 for implementation and enforcement on the local network. At the same time, the AAA server 204 preferably serves as the Foreign AAA and can relay the RADIUS packets to a remote Home AAA 45 via broker networks, allowing the efficient implementation of roaming agreements without any direct interaction between the 3G provider and the WISP.

A primary function of the WLAN gateway 40 is to provide Internet access to only legitimate users. Therefore, the WLAN gateway 40 authenticates the users. Furthermore, in a wireless environment where eavesdropping is easy, user's data privacy may be a concern. Authentication and privacy are addressed below.

In the WLAN link-layer, there are three methods for addressing the issue of authentication and/or access control.

Static filtering based on MAC-address filtering: In this method, the WLAN access points (AP) 41 drop traffic of all hosts except those of certain pre-configured network devices. Typically the filtering rules are specified using the layer-2 address (aka media access control (MAC) or hardware address) of the network devices.

WEP (Wired-Equivalence Privacy) of the 802.11b standard: In this method, the WLAN APs 41 verify that the end host 100*a*-100*c* owns a shared secret in the form of a 40 or 104-bit WEP key, which is used for all network devices accessing the same AP.

The 802.1x standard: 802.1x is a newer standard for access control. Like WEP, access is allowed only after a successful authentication. Unlike WEP, the authentication key is not shared by all users. Rather, each user has her own authentication key. This is considered a significant improvement over WEP.

However, as detailed below, the first two methods are not suitable to be used in a public environment, and the third method is not backward compatible with legacy access points and mobile nodes that do not have 802.1x support.

In a public environment, configuring static MAC-addresses for each user in every access point is not feasible. In addition, the user population is not static and the eligible list of MAC addresses keeps changing.

The main problem with WEP is that the same key is shared by all users using the same access point. In a public environment, it is very difficult to securely distribute and revoke this key for a dynamic user population. Furthermore, since the same key is also used for encryption, all authenticated users can snoop on each other's traffic. Apart from this problem, there are well-known attacks on the security algorithm of WEP.

802.1x is considered a significant improvement for the public environment. It allows authentication to the service provider's home network through Extensible Authentication Protocol (EAP)/RADIUS schemes such as EAP transport level security (EAPTLS), EAP-SIM, EAP-SKE. Additionally, individual per-user session keys, used for encryption and integrity protection, are derived and distributed during the authentication exchange with the Home-AAA server 45. This eliminates the need for any pre-configuration of keys and MAC addresses in WLAN access points 41, and only requires a security association between the user and their home service provider.

Factoring all the above considerations, the exemplary authentication model, illustrated in FIG. 5, is provide for the WLAN gateway 40. This model does not rely on any of these three methods, although it does not preclude the use of them, especially 802.1x. This embodiment uses dynamic MAC-address-based filtering in the gateway 40. The dynamic filter is updated upon successful user authentication. The filter update is an operating system kernel built-in feature. This is done by a system call with a whole range of possible parameters.

In the present model, a non-802.1x mobile node 100*a* can connect through the access point 41*a* without any layer-2 authentication. However, it cannot go any further and connect to the Internet 25 unless it has successfully authenticated with the gateway 40.

An 802.1x capable mobile node 100*c* needs to authenticate with both the access point 41*b* and the gateway 40 for access to the Internet 25. Note that these two authentications are at least partially complementary because 802.1x provides certain link-layer security features which gateway 40 does not provide, such as link-layer encryption and prevention of MAC-address spoofing. Furthermore, some optimization is possible for sharing of authentication information so that a user will need to log in just once.

For the authentication with the gateway 40, there are two possible paths corresponding to the two service modes. For Mobile-IP mode, the authentication is done as a part of the Mobile-IP registration, in which the mobile node (MN) 100a registers through the Foreign Agent (FA) 221 to the Home Agent (HA) 46. During the registration, the MN 100a presents to the FA 221 an evidence that it knows the MN-AAA key, which is a shared secret between the MN and the Home AAA (HAAA) 45.

For Simple-IP mode, the MN's authentication procedure is triggered by the first web access of the user. The first HTTP access is intercepted by the packet filter 223, and it is redirected to a Web Authenticator 241 in the gateway 40. The Authenticator 241 presents to the user a secured login page instead of the original web page that the user requested. The user enters her username and password to login. The Authenticator 241 authenticates the user by consulting the Home AAA 45.

The exemplary gateway does not provide data-link encryption as WEP or 802.1x do. For enhanced privacy external end-to-end privacy solutions such as IPSec/VPN or SSL may be used encrypt their data traffic. Note that WEP and 802.1x provide encryption only for the air link, so such end-to-end privacy solutions may be needed by the users in any event.

The AAA server 204 can be operated in the stand-alone server mode or relay mode. In the stand-alone mode, it supports standardized authentication protocols such as TLS, MD5, and One-Time Password (OTP) and the like. In the relay mode, the AAA server 204 relays the RADIUS packets to the remote H-AAA 45 via a AAA broker network or a pre-established pairwise security association. The gateway 40 also supports a web based authentication service that in Simple IP mode of operation allows it to authenticate mobile users using a simple web based form served over a secure SSL web connection to the web server 212.

Figure 4:
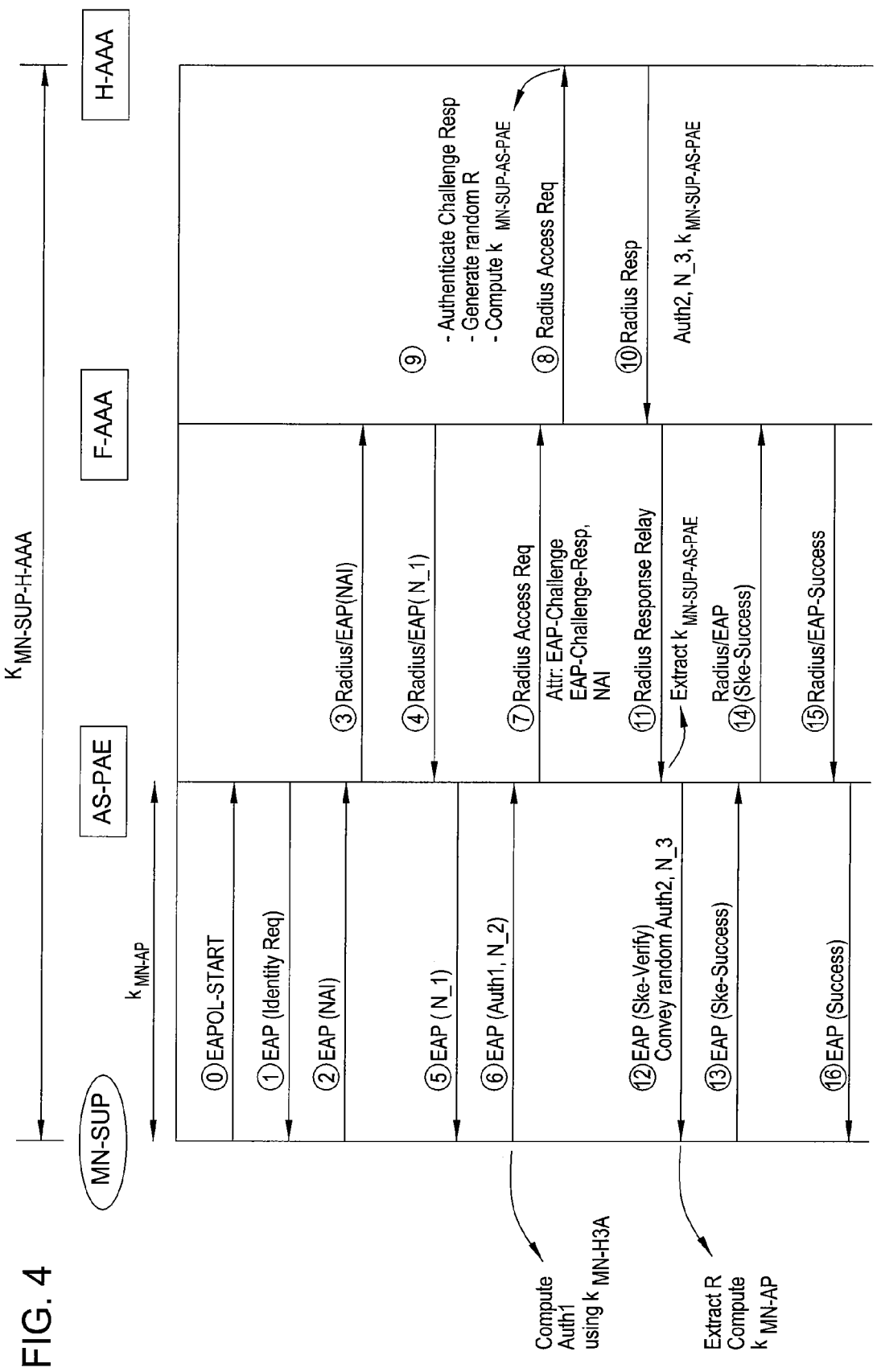
FIG. 4 shows data flow for an accounting subsystem that may be used in some embodiments of the present invention.

AAA server 204 also supports an authentication protocol called Shared Key Exchange (SKE). This protocol: (1) avoids transmission of critical authentication information such as password or encryption key(s) in the clear on the wired or wireless medium; (2) supports efficient mutual authentication between the MN 100a and a Home-AAA (H-AAA) 45; (3) provides per-user, per-session dynamic session keys that are guaranteed to be fresh; and (4) efficiently supports roaming across multiple network provider domains. The basic message flow for this protocol is illustrated in FIG. 4. In the roaming scenario, SKE requires only one round-trip to the H-AAA 45 and at most three roundtrips to F-AAA. The SKE protocol compensates for scenarios wherein F-AAA and AAA server-port access entity (AS-PAE) entities in a visited domain along the path between the MN 100a and the H-AAA 45 are partially trusted and are likely to collude to steal service. The per-session master secret key derived in SKE can be used by the AS-PAE and the MN to derive other session keys such as encryption, authentication and anonymity keys and also, as a base key for re-keying procedures. Compared to the state of the art authentication protocols, SKE is easy to implement, requires minimum number of network messages and guarantees strong security. The SKE protocol is implemented as an Extensible Authentication Protocol (EAP) method called EAP-SKE and new packet formats for the same have been defined. The exemplary embodiment of EAP-SKE terminates the EAP protocol at the F-AAA and uses RADIUS vendor extensions to communicate SKE specific information from F-AAA to H-AAA.

Mobile-IP Agent

The gateway 40 preferably implements a very scalable and efficient Mobile-IP agent function 202, which supports the roles of both Home agent 222 and Foreign Agent 221 (HA and FA, respectively). The Foreign Agent 221 is used to manage the mobility of clients 100a-100c that move across different wireless technologies. In fact, CDMA 2000 uses Mobile-IP Foreign Agents in the PDSNs 50, and calls for the use of Mobile-IP to support seamless internetwork handoffs. By extending this functionality into the 802.11 network, the integration of the two mobility management mechanisms becomes automatic.

The Home Agent 222 is preferably used to support a standard called "dynamic Home Agent allocation". In this case, during the initial authentication phase, the AAA infrastructure can allocate a Home Address and a corresponding Home Agent dynamically, every time a client session commences. This allows the HA 222 to be allocated closer to the FA 221, reducing the length of the network path between them, and thus reducing the IP tunneling overhead. With this optimization, the mobile station's IP address is no longer well known across sessions, but it remains the same for a single Mobile-IP session.

Dynamic Firewall

In another preferred embodiment of the present invention, the gateway supports a dynamic stateful firewall service 270, preferably implemented using the Linux IP Filter architecture. The Gateway 40 modules preferably use the IOTA Packet Filter library (IPF), which is an abstraction layer on top of the IP Filter architecture, to install complex sets of packet filtering rules that depend on per-user policies. IPF is a wrapper to make the OS-dependent packet-filter management interface invisible to the other gateway modules. It is for implementation convenience. Such policies are dynamically obtained from the subscriber's Home AAA, hence the term "dynamic firewall service".

The Mobile-IP agents 221, 222 and the AAA server 242 upon successful authentication install (through IPF 223) sets of rules that implement two major functionalities: firewalling and packet-mangling in block 270. The firewalling rules serve the dual purpose of protecting the clients from malicious attacks coming from the Internet (such as PING floods, TCP syn floods, etc.), and of protecting the Gateway 40 itself against traffic coming from malicious clients. IPF 223 preferably installs firewall rules that match layer-2 information, such as the MAC address of the clients. Therefore, attacks such as EP address spoofing become difficult to perpetrate.

The packet-mangling rules deal with the automatic redirection of user's traffic to local services, such as a local DNS server or the web-cache 211 (FIG. 3). Once again, these rules are all implemented on a per-user basis, depending on the user's profile downloaded from their Home AAA server 45.

QoS Module

In another preferred embodiment of the present invention, the system provides Quality of Service in the form of multiple service classes, each with a guaranteed minimum bandwidth. For example, a system can be configured with three classes (Gold, Silver, Bronze) and each class can be guaranteed a minimum bandwidth such as 750 Kbps for Gold, 250 Kbps for Silver and 125 Kbps for Bronze. If extra bandwidth is available, users can exceed their minimum rate, with high class users getting the priority to grab excess resources. Users are assigned to their corresponding class based on information contained in their user profile, which is obtained by the Gateway 40 during the authentication phase, as explained with reference to FIG. 6. To achieve end-to-end QoS, a QoS infrastructure (such as the IETF's differentiated-services, integrated-services or MPLS) is preferably provided over the entire network path.

A system according to one preferred embodiment of the present invention provides QoS in 802.11 networks without air-link QoS mechanisms. While numerous research activities attempted to solve the fairness issues and to ensure different QoS levels in 802.11-type multiple access networks, prior proposals approach the problem at the MAC layer (layer-2) level, mostly by manipulating the back-off mechanism. The exemplary gateway 40 takes a different approach by controlling the amount of traffic which competes for resources, instead of prioritizing traffic when congestion occurs. The system, located between the 802.11 APs 41 and back-haul link 31 (FIG. 1), preferably controls all the traffic to and from the hot-spot, and manages the bandwidth for each user. The system first estimates the capacity of the wireless link—for example, the actual link capacity (in terms of total throughput) of an 802.11b network is around 4 to 6 Mbps depending on the vendors—and then shape the downstream traffic (i.e., packets from the Internet 25 to mobile hosts 100a-100c) at the gateway 40 to prevent excessive traffic from reaching to the wireless link. The upstream traffic (i.e., packets from mobile hosts to the Internet) is preferably controlled similarly but in an indirect way, by relying on the higher-layer congestion control mechanisms (e.g., TCP). If a host pumps more traffic than its fair share into the network, gateway 40 drops or delays it packets so that the host can detect congestion and slow down the traffic generation. Gateway 40 can accelerate the congestion detection at the client, by sending explicit ICMP source-quench messages.

The gateway 40 preferably manages bandwidth in two spots where congestion can occur, namely (1) the 802.11 APs, and (2) the back-haul link to the Internet that can be over-subscribed. The Gateway 40 preferably uses SNMP queries to 802.11 APs to detect new user arrivals and user movements, and maintains the up-to-date user population map across APs. This map and the user profile obtained from the Home AAA are preferably used to determine each user's fair share of bandwidth. Depending on the pattern of user population, the 802.11 link or the back-haul link becomes the bottleneck, which results in the traffic shaping of some (or all) of the user's traffic. The gateway 40 also preferably provides admission control. Specifically, in case the wireless link bandwidth or the back-haul bandwidth is already entirely allocated to existing users, the gateway can be configured to either reject new users by blocking all their traffic, or to degrade them to the best-effort class, which does not get any rate guarantee.

The rate adaptation mechanism may be implemented using a simple token bucket scheme with low performance overhead. Two token buckets may be assigned for each user, one for upstream traffic, the other for downstream traffic. Since it works at the IP layer, this mechanism will co-exist with future QoS mechanisms that the IEEE 802.11e standards may mandate.

Figure 6:
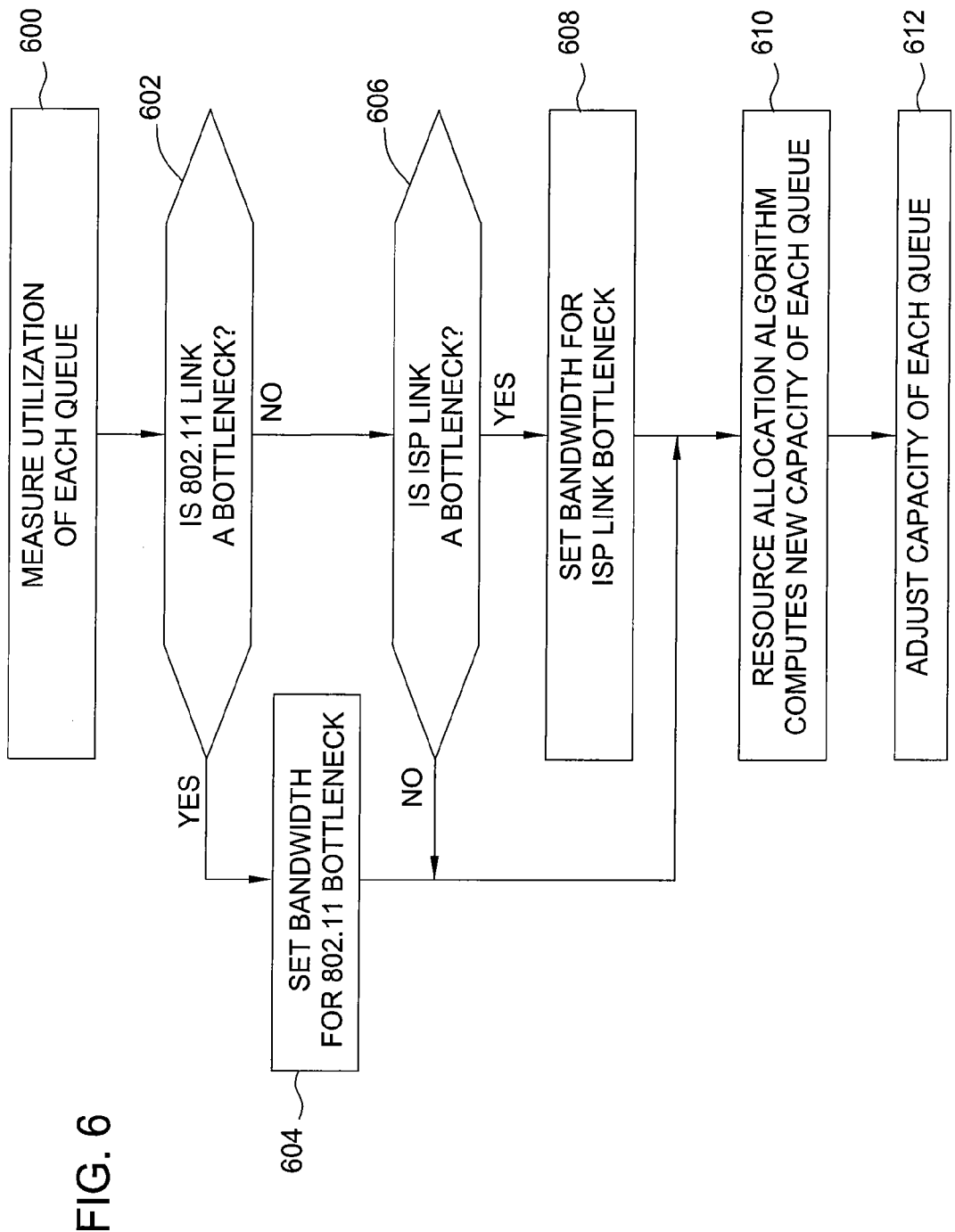
FIGS. 6 and 7 are flow charts showing operation of a quality of service function in the gateway of FIG. 2.

FIG. 6 shows the flow diagram of the queue management module. The prioritized assignment of the excess resources to non-satisfied users is the key function of the resource allocation algorithm. However, notice that this is just one example of many possible resource allocation algorithms.

At step 600, the utilization of each queue is measured.

At step 602, a determination is made whether the wireless (e.g., 802.11) link 41 is a bottleneck. This could occur if too many mobile nodes are simultaneously admitted to transmit or receive data by way of an individual access point 41.

At step 604, if the wireless link 41 is a bottleneck, then the amount of bandwidth that is to be divided among the registered wireless link users is set to the appropriate value for a wireless link bottleneck.

At step 606, a determination is made whether the ISP link 31 is a bottleneck. This could occur if the aggregate of all the data flows through all of the access points 41 is too large for the bandwidth of the ISP link 31.

At step 608, if the ISP link is the bottleneck, then the bandwidth to be divided up is set to the appropriate value for an ISP link bottleneck.

At step 610, the resource allocation algorithm computes the new capacity of each queue. As noted above, where there are guaranteed QoS levels, each guaranteed QoS user is allocated at least the guaranteed average bandwidth (or at most the guaranteed average packet delay). Any excess bandwidth may either be divided proportionately among guaranteed QoS users, or additional users may be admitted. Additional users can only receive a QoS guarantee if the total of such guarantees does not exceed the total bandwidth (of the access point for an 802.11 bottleneck, or the total bandwidth of the ISP link for an ISP bottleneck). In other embodiments, where a maximum bandwidth (but not guaranteed bandwidth) is defined for each user, each user receives a bandwidth given by:

$$B(i) = MB(i) * \frac{LB}{SB}, \quad \text{if } LB < SB$$
$$= MB(i), \quad \text{if } LB \geq SB$$
$$\text{where } SB = \sum_{i=1}^{N} MB(i),$$

B(i) is the bandwidth to be allocated to user (i), MB(i) is the maximum bandwidth allocable to user (i), LB is the link bandwidth, and N is the number of users.

At step 612, the capacity of each queue is adjusted.

Performance of QoS mechanism

The performance characteristics of the exemplary rate adaptation mechanism which enables QoS guarantees was demonstrated. In the following three scenarios, three MS-Windows laptops were wirelessly connected to a single 802.11 AP. On each laptop, an FTP application was run to download a large file from an external server. The back-haul connection of the gateway was configured to be a 10 Mbps Ethernet.

Figure 7:
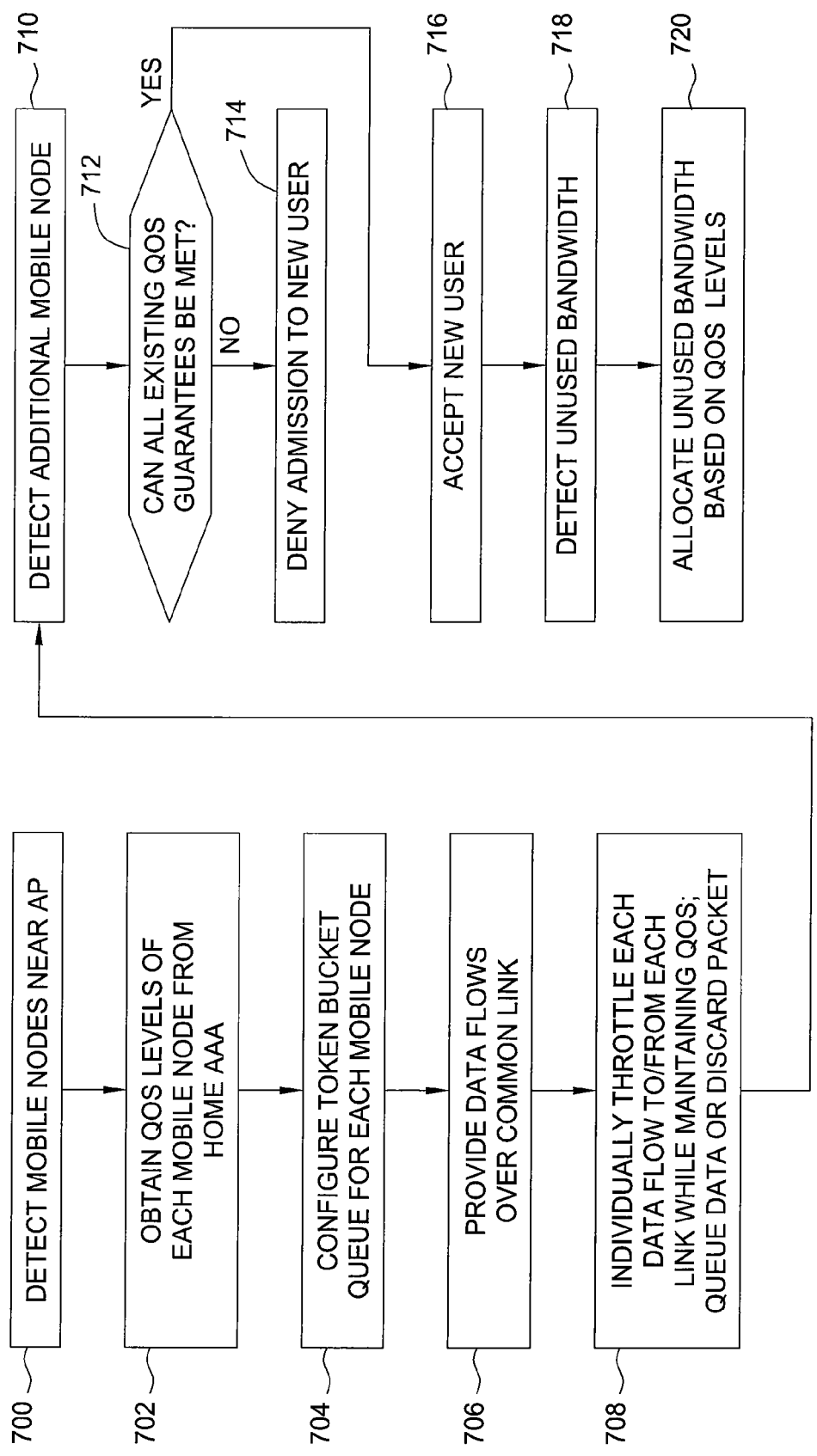

FIG. 7 is a flow diagram of a method for implementing the QoS levels. Further details of the individual steps are provided further below.

At step 700, the gateway 40 detects a plurality of mobile nodes within the range of an AP 41.

At step 702, the gateway 40 obtains the QoS levels for each mobile node from that mobile node's respective home AAA server 45.

At step 704, the gateway 40 configures a token bucket queue for each of the mobile nodes.

At step 706, the individual data flows for each mobile node are provided over the wireless link.

At step 708, each data flow is individually throttled while maintaining the desired QoS for the corresponding mobile node. For example, where TCP is used, the gateway may either queue packets for discard packets to reduce the data flow to a particular user.

At step 710, an additional mobile node is detected proximate to the AP 41.

At step 712, a determination is made whether the admission of the additional mobile node to the AP will interfere with meeting the QoS guarantees of the existing mobile nodes that are already using the AP.

At step 714, if admission would interfere with an existing QoS guarantee, access is denied.

At step 716, if all existing QoS guarantees can be met, then the new user is accepted.

At step 718, unused bandwidth is detected.

At step 720, any unused bandwidth is allocated based on the QoS levels of each user.

Some embodiments also preferably support Mobile-IP tunnels and IP-sec tunnels. The queue management module is preferably aware of the mapping between the tunnel IP addresses and the encapsulated packet's IP addresses. A Mobile-IP Foreign Agent (which can reside inside the QoS gateway) preferably informs the QoS gateway of the address of Mobile-IP user's Home Agents. The IP-sec tunnel that is initiated by a user host contains the host IP address at the tunnel header, so that the QoS gateway can identify the sessions.

Accounting Module

The potential to share usage revenue is one of the key business motivations for a 3G carrier and a 802.11 service provider to sign a roaming agreement with each other. To support this, after a user is authenticated and authorized to use a foreign 802.11 network, the Gateway 40 preferably collects accounting data of the user session and forwards them to the home accounting server for billing purposes.

Since the Gateway 40 preferably supports three different operation modes, there are preferably three entities that may authenticate users and request services from the accounting sub-system. If Mobile-IP is used, the entity is the Foreign Agent. If, as explained later, the Simple-IP mode is used the entity is the web authenticator. If 802.1X is used, the local AAA server is involved in the exchange of EAP messages and is also one such entity. These entities, referred to herein as "the applications", request accounting services by triggering accounting start and stop operations.

Preferably, embodiments of the present invention provide the accounting mechanism but do not mandate the specific pricing policies such as time-based, usage-based, or flat-price scheme. Therefore, all potentially relevant accounting data of a user session are collected. They can include start and stop times, duration packet and octet counts. The accounting subsystem preferably obtains these data from different sources. It obtains the time and duration data from the subsystem clock when the start and stop triggers happen. It obtains the packet and octet counts from the kernel through a special call to the IPF module. The accounting subsystem also obtains auxiliary information such as user identity, IP address, MAC address, etc. from the active-session database.

Preferably, these data are then transmitted to an accounting server using accounting start, stop, and interim-update messages. The system preferably uses RADIUS to send these messages, but in the future we may support other protocols such as the DIAMETER or the protocols required by UMTS.

Figure 11:
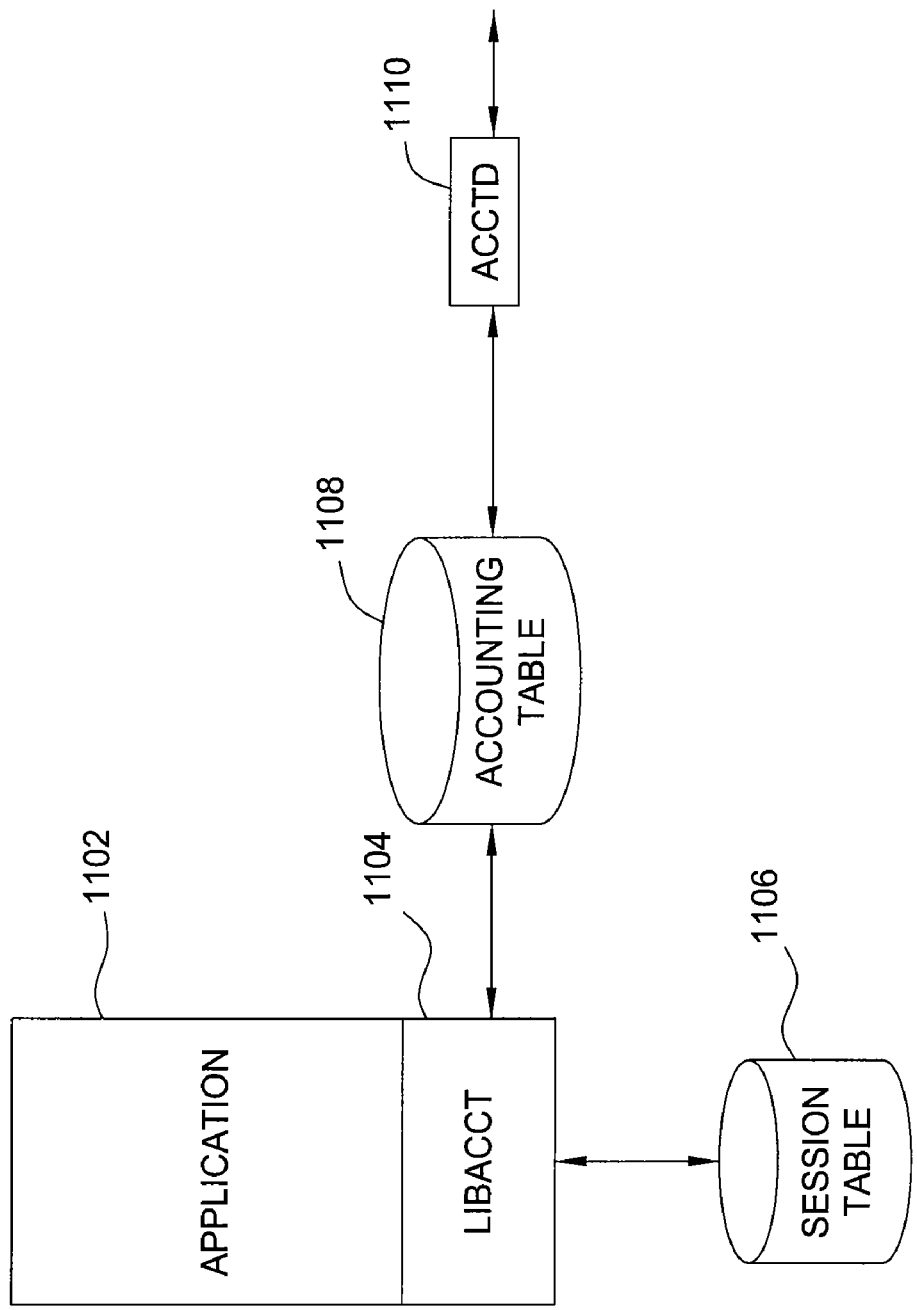
FIG. 11 is a block diagram of an exemplary accounting system used in the gateway of FIG. 2.

FIG. 11 illustrates the architecture of a preferred embodiment of an accounting subsystem. The application links with a library 1104 called libacct. Five steps are involved for the generation of accounting messages: (1) The application 1102 triggers an accounting operation (start or stop). (2) Upon a trigger, the libacct library 1104 collects all necessary accounting information. (3) The libacct library 1104 then persistently stores the information into a table 1108 kept in the local database and returns control to the application 1102 immediately—this design makes accounting operations non-blocking yet reliable to the application. (4) A software task 1110 called acctd daemon or service, periodically polls the accounting table 1108; (5) Acctd then formats the information into RADIUS acct-start and acct-stop messages. It also generates periodic RADIUS acct-interim-update messages for active sessions. The transmission of these messages to an accounting server are done in the background and may involve retries and failovers.

Integrated Web Cache

Often, wireless internet service providers (WISPs) will choose to oversubscribe the back-haul link that connects their 802.11 network to the rest of the Internet. For example, while a single 802.11 access point may have a throughput of 11 Mbps, the back-haul link may be a 1.5-Mbps cable-modem link. Intuitively, a web cache placed on the hot-spot allows re-use of frequently visited web content and should save the bandwidth of the back-haul link. However, when clients access the network using Mobile-IP, in order for the webcache to be effective, it needs to be integrated with the Foreign Agent.

Figures 3A, 3B:
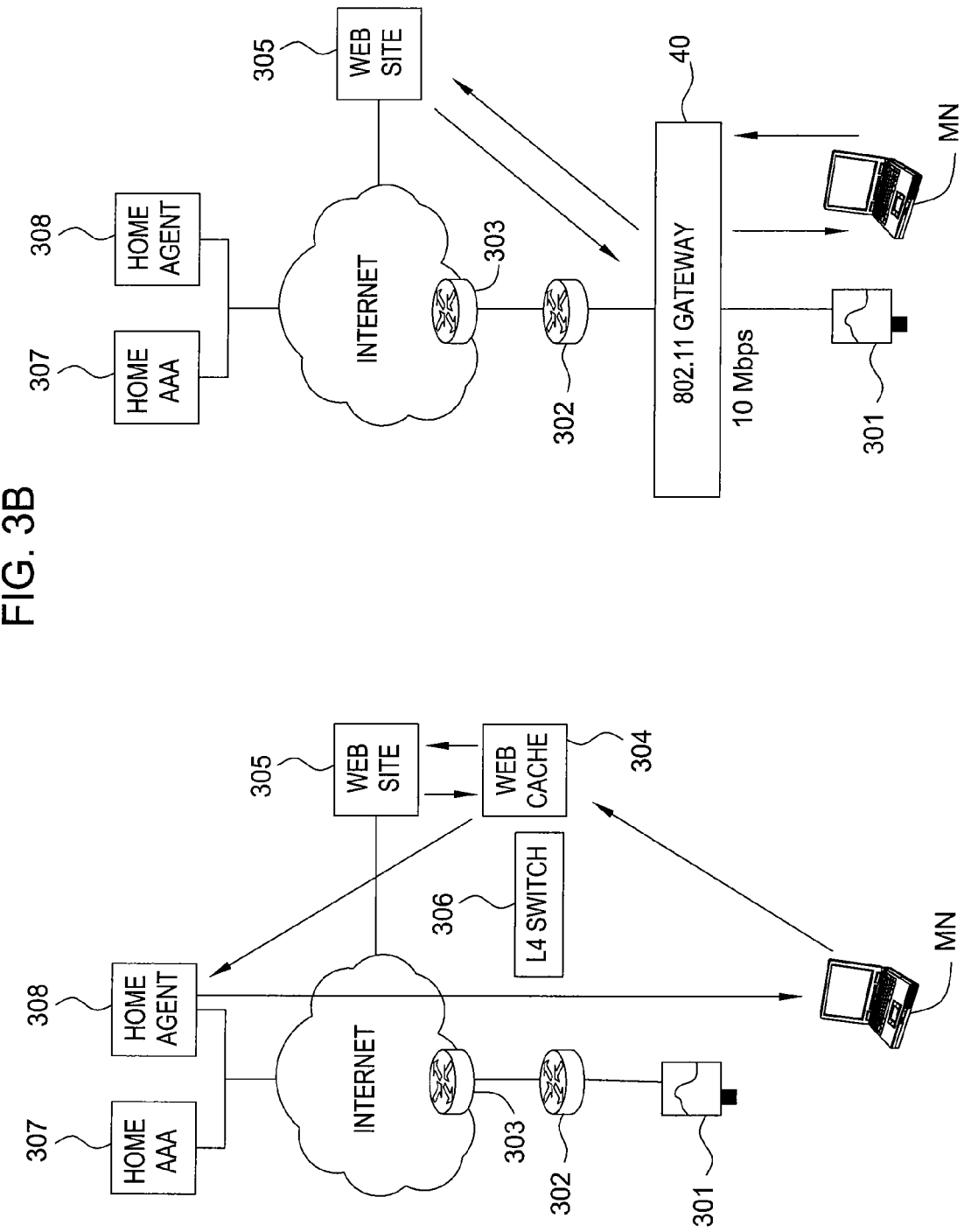
FIGS. 3A and 3B are functional block diagrams showing standard mobile IP operation and mobile IP optimization according to a preferred embodiment of the invention.

FIG. 3A illustrates what would happen if a web-cache 304 is provided, but is not an integrated part of the gateway. With the presence of a layer-4 switch 306, a user's web requests to a web server 305 get directed to the cache 304. In the case of a cache-miss, the cache 304 would forward the requests to the web server 305 and would obtain a response. In the case of a cache-hit, the cache 304 would already have the response in its own local disk. In either case, the cache 304 would forward the response back to the user's MN. However, in the case of Mobile-IP service, the requests coming from the user's MN would appear to have come from the user's home address. Therefore, the cache 304 would forward the response back to the home network of the mobile node, where the home agent 308 would tunnel the response back to the gateway 302. As a result, while the cache 304 is intended to reduce the traffic on the back-haul link, in this configuration, it would not eliminate any traffic even for cache-hits. In fact, the presence of the cache 304 would double the traffic volume on the back-haul for cache misses.

FIG. 3B illustrates the scenario in which the web-cache 211 is an integral part of the Gateway 40 (and collocated with the foreign agent). When the user is registered with the Foreign Agent 221, the agent uses the IP filter (IPF) module 233 to add a packet-mangling rule to the per-user set of firewall policies. The rule serves as a means for redirecting all web requests (TCP port 80) from the user to the local web cache 211, and as a means for directing all return traffic back to the user MN, avoiding the round-trip to the home network. With this integrated approach, the cache eliminates network traffic on the back-haul link for cache-hits and becomes effective.

The gateway 40 supports a full-fledged high performance web server 212 and an integrated transparent web cache 211. The web cache 211 significantly reduces the amount of bandwidth used on the uplinks and improves the download time for web content. In the MIP mode of operation, the integration of the web cache 211 with the MIP services 202 completely eliminates the traditional triangular routing overhead: in a traditional implementation (FIG. 3A) the traffic from the web cache 304 is forwarded to the HA 308 and then tunneled to the FA before getting routed to the MN. In gateway 40 (FIG. 3B), the web cache 211 directly sends the web content to the end user via the local FA 221. This eliminates roundtrip transmissions to/from HA 308, reduces precious bandwidth resource on the uplink and significantly improves performance.

The web cache 211 is "aware" of the mobile IP foreign agent 221 locally in the gateway 40. When a mobile node using the web cache 211 moves from the proximity of one gateway 40 to another similarly equipped gateway, a state exchange is performed between active session state databases 250 in the storage devices (e.g., memories) in the respective gateways, so that the web cache 211 does not send the packets to the foreign agent in the gateway of the home network, but instead sends it to the foreign agent 221 (where the mobile node is currently located), so that the packets continue uninterrupted. (This session state database 250 may be stored on a SQL database on a hard disk or in memory, and is shared by the web services 201, Mobile IP services 202, IP service component 203, and security and accounting 204.) To perform the state exchange, the second gateway initiates a message to the gateway of the home network indicating that the particular mobile node is now located at the second gateway. The second gateway may either send a unicast message if it knows the identity of the gateway of the home network, or the second gateway can send a multicast (or broadcast) message inquiring whether any of the other gateways have serviced this particular mobile node, which is now located at the second gateway. These exchanges between gateways may, for example, be implemented using the IETF seamless mobility (seamoby) protocol.

Figure 3C:
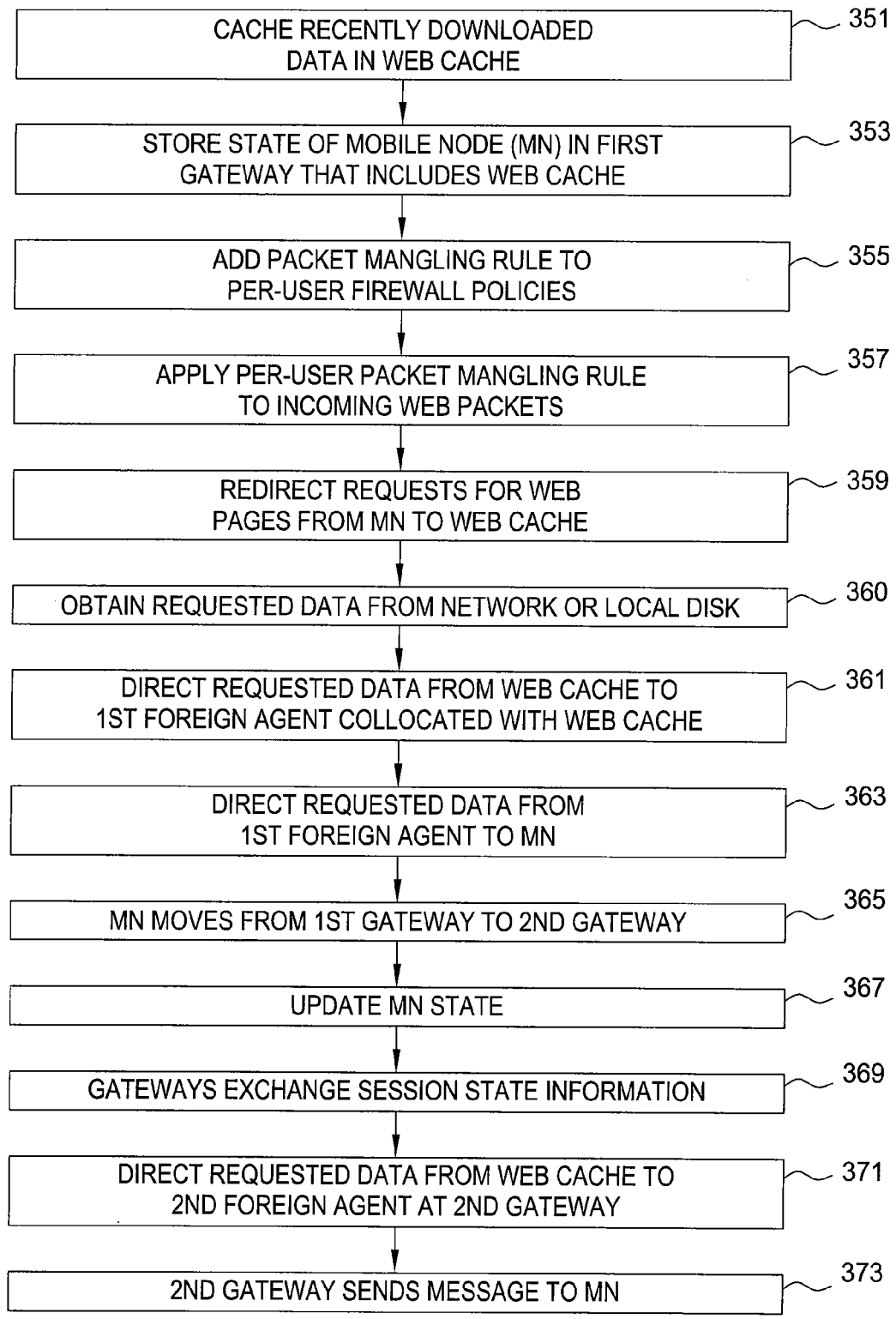
FIG. 3C is a flow chart diagram of an exemplary method for operating the web cache of FIG. 3B.

FIG. 3C shows an exemplary method for using the integrated web cache 211 with the gateway 40.

At step 351, the web cache 211 caches recently downloaded data, such as web pages.

At step 353, with the mobile node MN in the proximity of the first gateway 40 containing the web cache, the block 270 (FIG. 2) stores the state of the MN in the gateway 40.

At step 355, IPF 233 adds a packet mangling rule to the per-user firewall policy for the MN, causing the redirection of web requests and responses to reduce traffic.

At step 359, when the MN requests a web page, the request is redirected to the web cache 211.

At step 361, when the requested data are found in (or downloaded to) the web cache, the web cache directs the data to the first foreign agent 221 collocated with the web cache, instead of sending the data to the HA 308.

At step 363, the requested data are then directed from the first foreign agent 221 to the MN.

At step 365, the MN may move from the proximity of the first gateway 40 to another gateway.

At step 367, the state of MN is updated in the session state database of the second gateway.

At step 369, the gateways exchange session state data, so that both gateways are aware that the MN is now proximate to the second gateway.

At step 371, when the MN makes a new request for a web resource, the second gateway redirects the request to the web cache 211 where the MN is currently located. The web cache where the MN is currently located sends the downloaded data to the foreign agent at the second gateway (where the MN is currently located).

At step 373, the data are sent directly from the second FA to the MN.

It will be understood by those skilled in the art that the web cache can be implemented in an integrated gateway regardless of whether a QoS module and/or the accounting module are also included. Similarly, the web cache can be included in a gateway that supports mobile IP, with or without optional support for the simple IP mode, described below.

Simple-IP Operation

Although the ideal integration of 802.11 with 3G should support seamless inter-technology handoffs, one embodiment of the invention is designed for short term deployments, offering an intermediate type of service, often referred to a Simple-IP. The Simple-IP service preferably offers integrated authentication and billing. However, it does not support seamless mobility, and requires manual user intervention to switch network access. In this service, a session is authenticated via a web browser, while local network information such as client's IP address and default IP router is acquired using DHCP. This allows the end users to access the service without any specialized software and still receive some of the benefits discussed above.

In addition to the Mobile-IP service, the Gateway 40 preferably provides simultaneous support for the Simple-IP service. Specifically, the exemplary embodiment implements a DHCP server 232 and a web-based authentication system 213. Once the client starts up, it gets its IP address through DHCP. At the first attempt of accessing the Web, the IP packet mangling routines redirect the client's web browser to the local authentication page served over a Secure Socket Layer (SSL) connection. The Simple-IP authentication system, by means of the AAA server 204, authenticates the user to their Home AAA 45 either with their username and password combination, or with a One Time Password (OTP) mechanism that delivers single-use passwords through the cellular Short Message Service (SMS). Upon successful authentication, the web-server 212 uses the IPF APIs to configure the gateway's firewall 270 according to the downloaded user policy. The Gateway 40 preferably also supports private addressing schemes, using the NAT implementation included in the Linux IP Filer architecture.

Integration with UMTS

The current UMTS standards do not include support for the IETF AAA and Mobile-IP protocols. Therefore, the integration of the Gateway 40 with UMTS is somewhat more complicated than the case with CDMA2000. Although it is expected that the definition of usage for AAA and Mobile-IP within UMTS will soon become standardized, until then seamless inter-technology handoffs between 802.11 and UMTS networks can be handled with a Mobile-IP overlay onto the UMTS network. This introduces Mobile-IP at the GGSN 50, combining the Foreign Agent functionality with support for normal GGSN functionality, as outlined in "Technical Specification Group Services and System Aspects; General Packet Radio Service (GPRS); Service description", TS 23.060 Version 3.12.0, Stage 2, Release 1999, ETSI, June 2002, which is incorporated herein by reference. In this case, mobility within the UMTS network would be handled with the normal SGSN-GGSN procedures, whereas inter-technology handoffs with 802.11 networks would be handled with Mobile-IP procedures. The same client software would work for both UMTS and CDMA2000, with Mobile-IP registrations being invoked when moving under a new foreign agent (i.e. GGSN in the UMTS network). User authentication can be done through Mobile-IP procedures using a smart card (or SIM) to generate the required authenticator fields for the Mobile-IP messages. This IP-layer authentication procedure would be handled by a AAA server, either combined with or completely separate from the normal HLR functionality. Finally, an added software module could be used to convert the generated RADIUS accounting messages into the CDR format that is required to reuse existing UMTS billing systems.

Experimental Results

The Gateway 40 used in these experiments was implemented on servers with 800 MHz, dual Pentium CPUs, 256 MB memory, and 9 GB SCSI-II disks.

Performance of Mobile-IP Agents

The performance of mobility management in the gateway 40 can be characterized as the sum of two components: (1) the time needed to discover the presence of a Mobile-IP Foreign Agent on a new interface, and (2) the time needed to receive a Mobile-IP registration reply, after sending a registration request to that agent.

In Mobile-IP, agent discovery is performed through agent advertisements, which are sent by Foreign and Home agents periodically, as well as any time they receive an ICMP agent solicitation from clients. The advertisements are preferably sent out at a random time (between 0 and a maximum allowed for router advertisements) after the router receives an agent solicitation. The maximum is preferably tunable and is initially set to 500 ms. On average, it was observed that in the testbed, clients received advertisements 200 ms after the solicitation.

After agent discovery, the time it takes for a client to register with the Foreign Agent of Gateway 40 varies depending on three possible states that the client could be in. (1) In case the gateway 40 has no state information about the client, this is a first-registration delay, f, and it includes the overhead of AAA authentication, setting up packet filters, and creating tunnels between the Home and the Foreign agents. (2) The re-registration delay, r, is the time taken to reregister the client with the same gateway in an on-going registered session. This overhead includes AAA authentication, but it requires no time for tunnel or filter set up. Finally, (3) the switching-registration delay, s, is the time taken for registration when switching to an interface after the client had registered with the mobility agent on that interface at least once, i.e., when the receiving agent already had state information about the client. This includes the AAA authentication overhead, and tunnel set up at the home agent, but does not include the time taken for filter creation. It should be noted that, under the assumption of overlapping coverage of the 802.11 and 3G network, the above registration delays happen in the background and do not introduce any switching latency or service disruption visible at application level (i.e., the overlapping coverage guarantees that there is no packet-loss during the handoffs).

TABLE 1

IOTA Mobile-IP registration delays (all in milliseconds)

| | FirstReg f | ReReg r | SwitchReg s |
|---|---|---|---|
| Ethernet | 370 | 40 | 50 |
| 802.1 lb | 410 | 40 | 60 |
| CDMA2000 | 390 | 260 | 260 |

Table 1 shows the preliminary results for prototype systems. The time taken for re-registrations and switching-registrations is very small, under 60 ms in both 802.11 and Ethernet, and tolerable in CDMA2000. The first-registrations times cost the most, since that involves setting up Mobile-IP tunnels as well as packet filters. The first-registration procedures may complete much quicker upon optimization of the filter and tunnel set up.

Adding the agent discovery delay (200 ms) to the registration delays (410 ms) leads to worst-case total switching times ranging from 570 ms to 610 ms. Such sub-second latencies should be more than tolerable, and would allow for seamless handoffs for moving speeds in the range of a few tens of kilometers per hour.

Finally, the re-registration time was measured under varying forwarding load. The TCP traffic through the Gateway 40 was varied (using Ethernet) from 10 Mbps to 100 Mbps, using a home-grown traffic generator. The gateway 40 was able to sustain close to 100 Mbps forwarding load and sill provide re-registration of the order of 40-50 ms.

Performance of QoS Mechanism

The performance characteristics of the rate adaptation mechanism which enables QoS guarantees was demonstrated. In the following three scenarios, three MS-Windows laptops were wirelessly connected to a single 802.11 AP. On each laptop, an FTP application was run to download a large file from an external server. The back-haul connection of the Gateway 40 was configured to be a 10 Mbps Ethernet.

Figure 8:
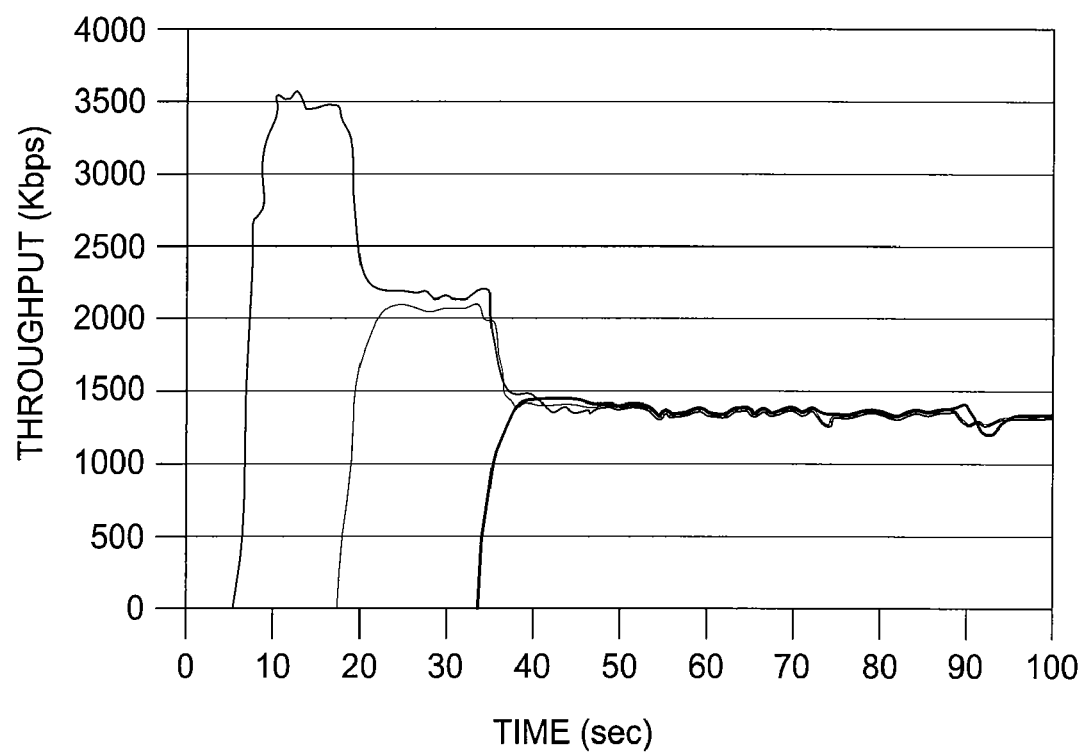
FIGS. 8-10 are graphs showing the experimental results of the performance characteristics of the rate adaptation mechanism of one embodiment of the present invention.

FIG. 8 shows a first example in which three users attempt to use a link, beginning at different times. This scenario (FIG. 8) illustrates restricting per-user traffic to 3.5 Mbps. At first, a single user gets 3.5 Mbps. As a second and a third user arrives, they all get equal share of the available bandwidth which is around 4.5 Mbps (which is lower than the capacity of an 802.11b cell; this is due to contention among users and uplink control traffic). In this example, each user has the same QoS level. Initially, user 1 has exclusive use of an access point, and is limited to about 3.5 Mbps bandwidth. This is less than the total bandwidth available on the link. At about 18 seconds elapsed time, user 2 begins to access the link. Within a very short period, the bandwidth for user 2 reaches about 2.2 Mbps, and that of user 1 drops to about the same. Thus, the two users are sharing the total bandwidth of the link—about 4.4 Mbps. At about 33 seconds elapsed time, user three begins to access the link. All three users are very quickly allocated about 1.4 to 1.5 Mbps.

Figure 9:
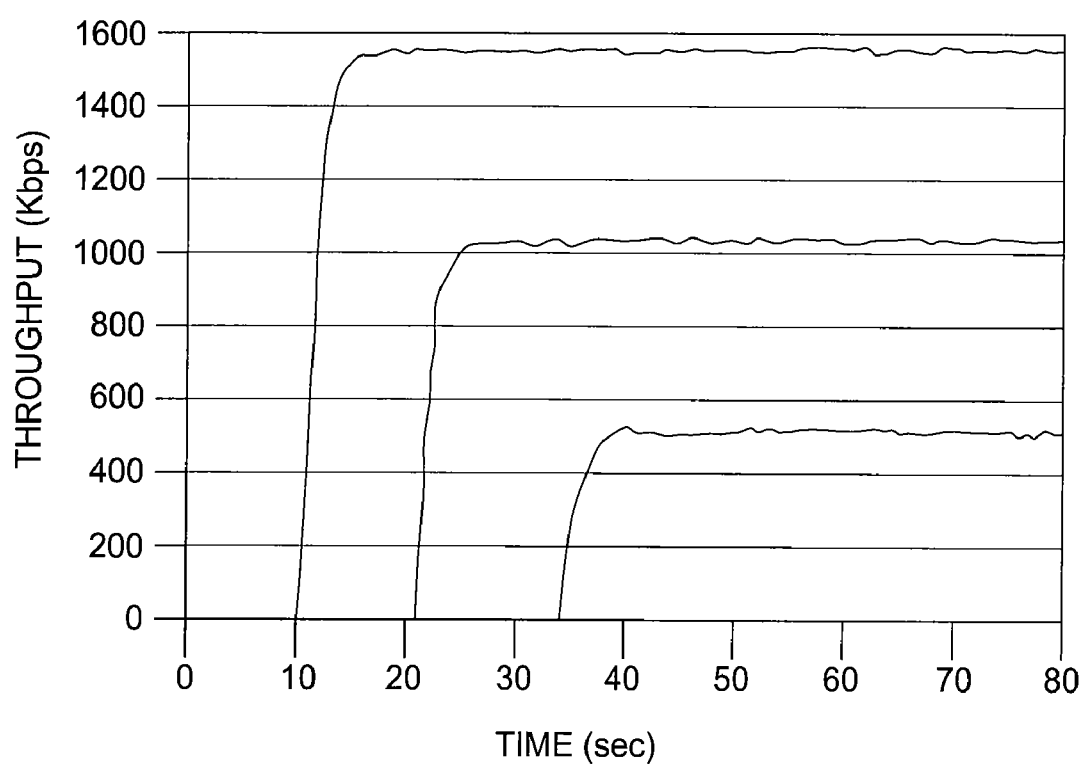

FIG. 9 shows an example in which three users have respectively different QoS levels. In this scenario, the class-based configuration was enabled with Gold, Silver and Bronze classes with maximum rates of 1.5 Mbps, 1 Mbps, and 0.5 Mbps, respectively. In this case, the total of the maximum bandwidths allocable to the three users is less than the total bandwidth (about 4.5 Mbps) available on the link. Initially, the Gold class user has throughput of about 1.5 Mbps. At about 20 seconds elapsed time, the Silver class user begins using about 1 Mbps. The Gold class user's data rate is unaffected. At about 34 seconds elapsed time, the Bronze class user is allocated about 0.5 Mbps bandwidth. Both the Gold and Silver class users are substantially unaffected. FIG. 9 shows that the QoS level of each class is maintained quite well. The slightly higher actual throughput than the specified maximum rate is attributed to the selection of token bucket parameters.

Figure 10:
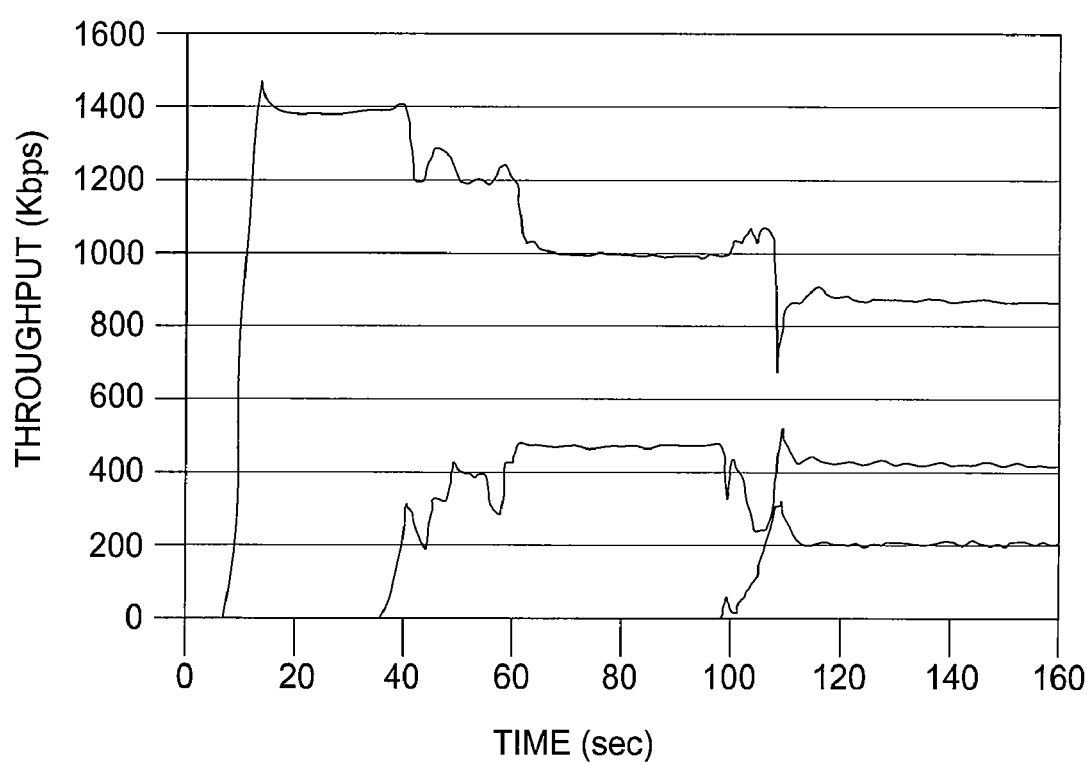

FIG. 10 shows a third scenario in which class-based queuing works with a background load of 3 Mbps (essentially reducing the available bandwidth of the link to 1.5 Mbps). A single Gold user (max rate 1.5 Mbps) is able to access all of the 1.5 Mbps initially. However, beginning at about 40 elapsed seconds, as Silver (max rate 1 Mbps) user begins to use the link, the Gold user's bandwidth drops to about 1 Mbps, while the Silver user receives about 0.5 Mbps. At about 100 seconds elapsed time, the Bronze (500 Kbps) user arrives, and the available bandwidth is shared proportionately to their maximum rate. The Gold user's rate again drops to about 0.9 Mbps, the Silver user to about 0.4 Mbps, and the Bronze user only receives about 0.2 Mbps. The jittery periods are due to the rate adjustments and their length depends primarily on the rate adaptation algorithm.

Implementation Of Present Invention

The present invention may be implemented with any combination of hardware and software. The present invention can be included in an article of manufacture (e.g., one or more computer program products, having, for instance, computer usable media). The media has embodied therein, for instance, computer readable program code means for providing and facilitating the mechanisms of the present invention. The article of manufacture can be included as part of a computer system or sold separately.

Gateway Operation with Wireless Backhaul

Figure 12:
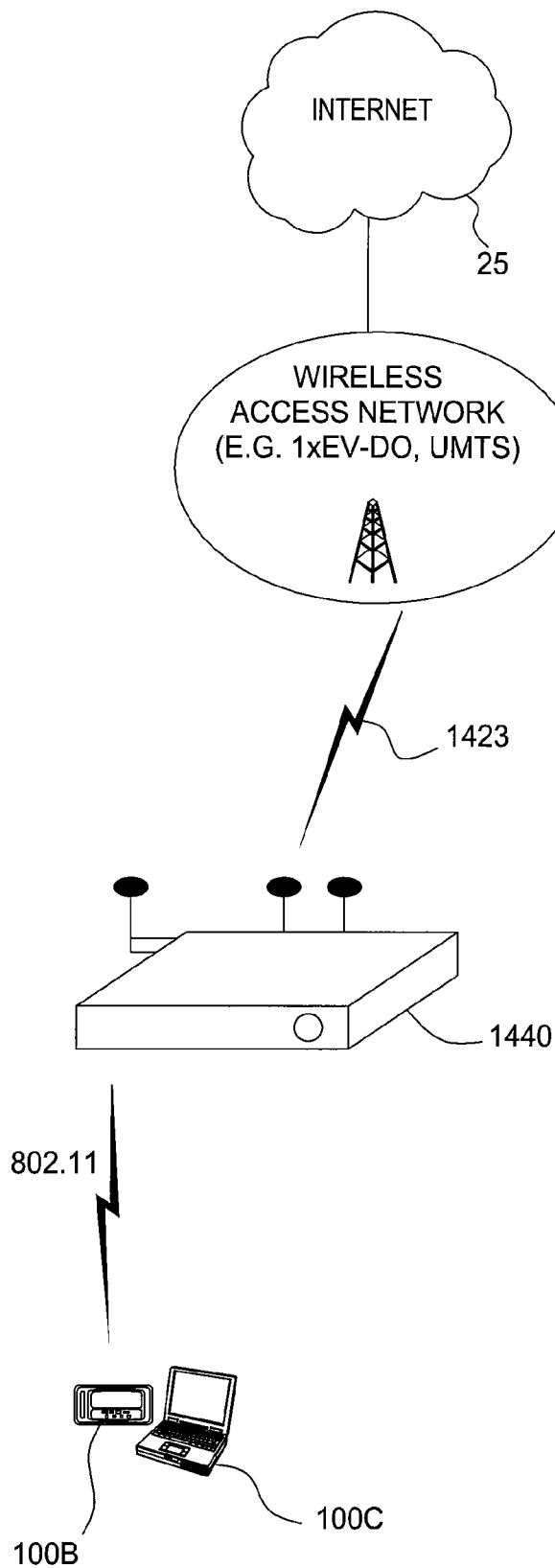
FIG. 12 is a diagram of a system including a mobile hotspot gateway.
Figure 13:
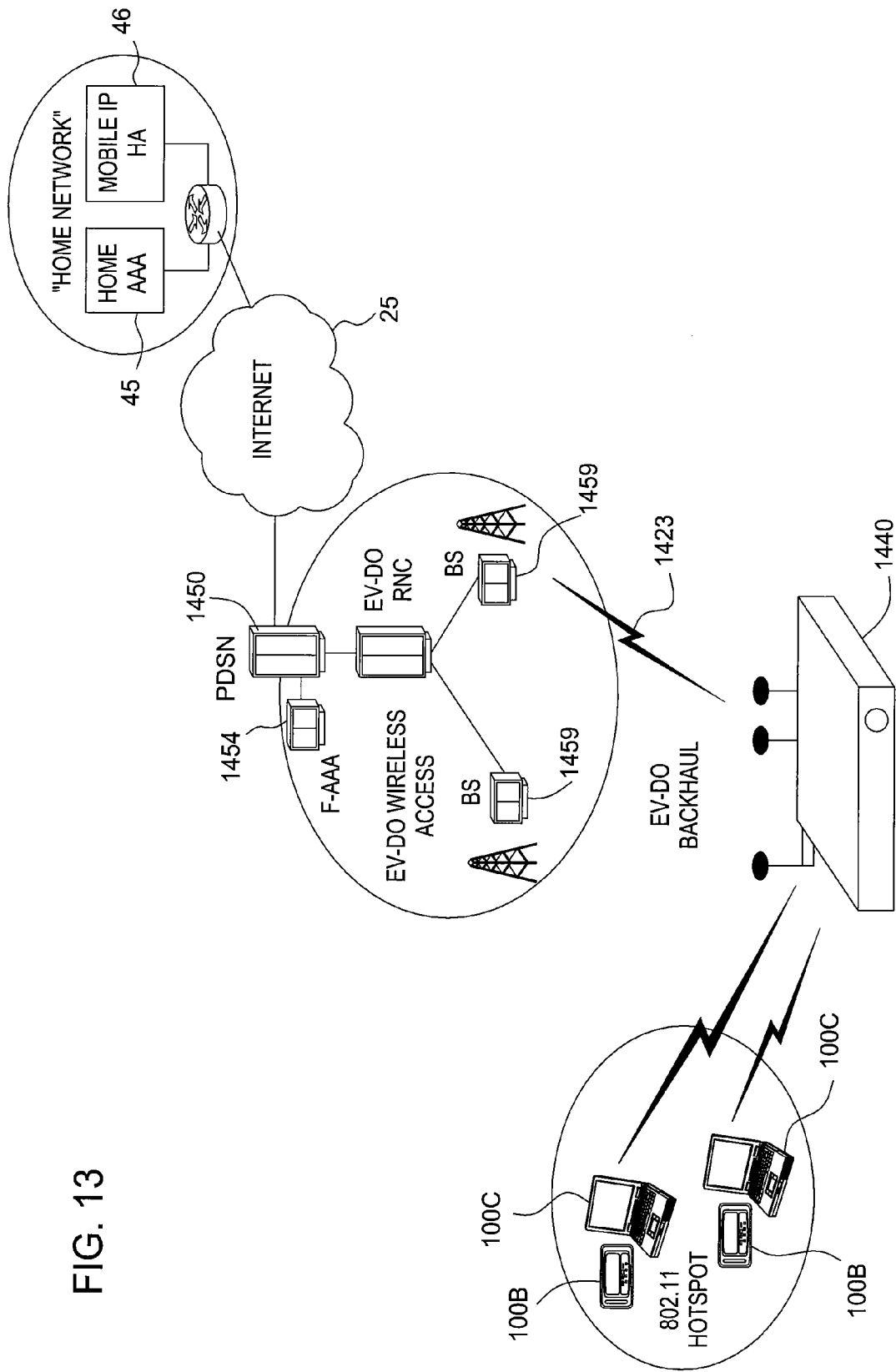
FIG. 13 is a more detailed diagram of the system of FIG. 12.
Figure 14:
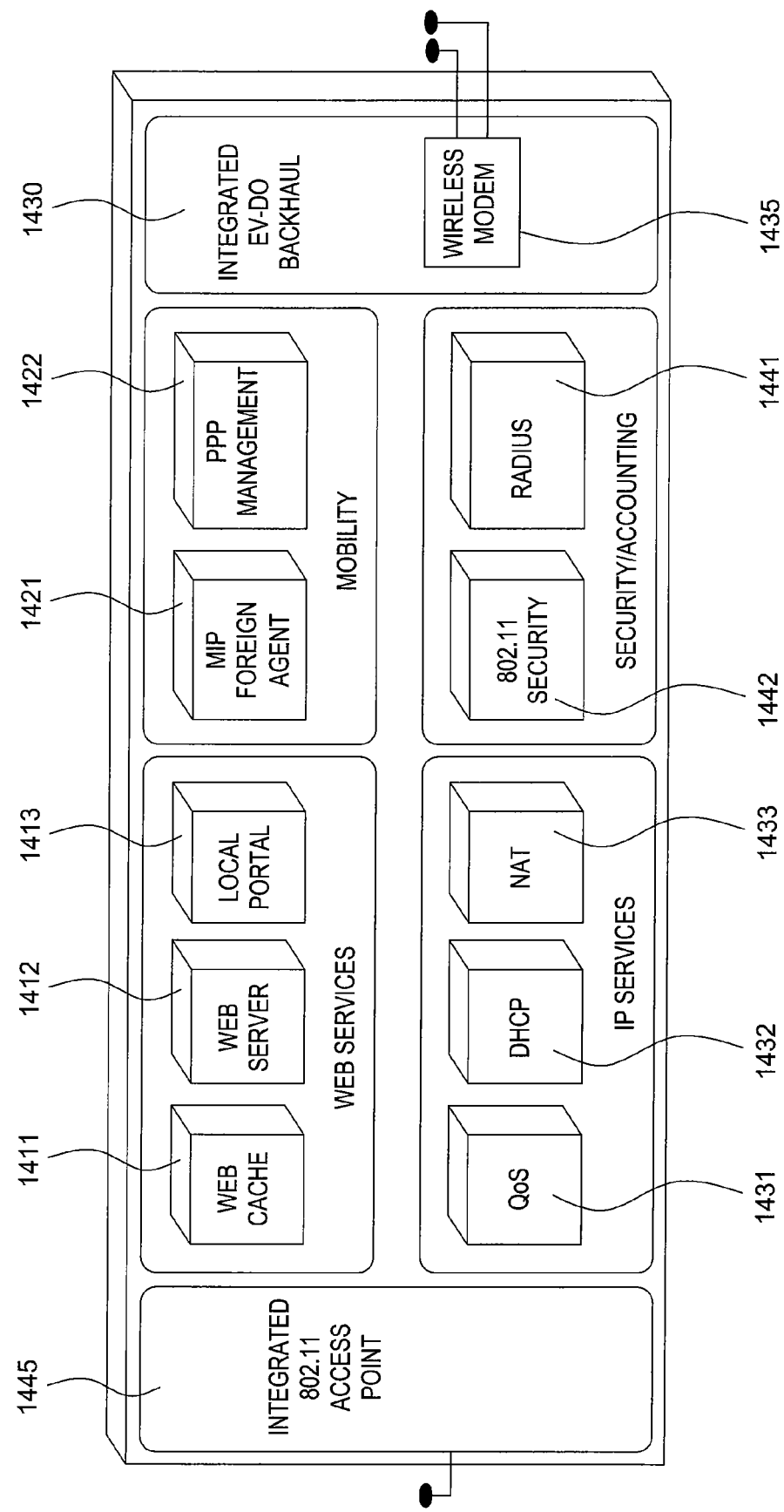
FIG. 14 is a block diagram of the mobile hotspot gateway of FIG. 12.

FIGS. 12-14 show another exemplary embodiment in which the gateway 1440 has a wireless backhaul link 1423 and is capable of functioning in a mobile environment. The MobileHotSpot Gateway 1440 combines an 802.11 AP 1445, a Wireless modem 1435 for Backhaul, and a Public Access Gateway. The backhaul link 1423 is established via a 3G wireless data channel such as CDMA 1x Evolution Data Only (EV-DO), UMTS, 1xRTT, GPRS, or CDMA 1x Evolution Data and Voice (EV-DV). Subscribers can access the Internet in buses, trains, or hotspots using 802.11 in the same manner as they do at home and at work, to connect to the backhaul wireless data channel such as EV-DO, UMTS, 1xRTT, GPRS, or other such wireless packet data channel. The client may have both an 802.11 card and a 3G card. The client uses 802.11 to connect to the gateway 1440, and the gateway 1440 connects to the rest of the Internet by a wide area wireless link (because the user does not have a wired link such as ethernet or Sonet link available).

The wireless modem 1435 for the backhaul may be embedded into the gateway 1440 or connected externally (e.g. ethernet, USB, or the like). Preferably, the wireless modem 1435 is either contained within the same housing as the gateway 1440 or attached to the housing of the gateway. Similarly, the AP 1445 may be embedded into the gateway 1440 or connected externally, and is preferably either contained within the same housing as the gateway 1440 or attached to the housing of the gateway.

FIG. 13 shows an exemplary network implementation including the gateway 1440 of FIG. 12. The wireless access network 1423 is shown in greater detail. The base stations (BS) 1259 and the EV-DO RNC 1258 bridge the wireless and wired network. Both the MobileHotSpot Gateway 1440 and individual users 100b, 100c are authenticated to the Home-AAA 45. Thus, billing can be done for the entire HotSpot 1440 and/or for individual users 100b, 100c. Multiple users' 802.11 traffic is aggregated through one EV-DO back-haul connection 1423. Multiple Networking Modes of Operation are provided for the subscriber 100b, 100c and gateway 1440, including: SimpleIP or MobileIP. A subscriber with 802.11 can use either SimpleIP (if the subscriber has no MobileIP client) or MobileIP (if the subscriber has a MobileIP client) to start a session.

FIG. 14 is a block diagram of the MobileHotSpot Gateway 1440. Some embodiments of the exemplary gateway 1440 include several functions that are the same as or similar to those in the gateway 40 of FIGS. 1 and 2, including: mobility management functions (e.g., MIP Foreign agent 1421 and PPP management 1422 (Also used in Simple IP) and security/accounting functions (e.g., 802.11 security 1442 and RADIUS 1441). MobileIP authentication is performed by the Foreign Agent 1421, using the foreign AAA. Alternatively, a Browser-based system, with one-time SMS password could be used in Simple IP mode, or 802.1x/EAP through Radius may be used in mobile IP or simple IP mode. PPP management 1422 provides PPP restoration and management of changing IP address on the EV-DO backhaul 1423. With respect to accounting, reliability is provided with a persistent store for accounting information, interim accounting, and compliance with 3GPP2 standards.

Additional optional functions shown in FIG. 2 may also be incorporated into the gateway 1440, including, for example, web services (e.g., web cache 1211, web server 1412 and local portal 1413) and IP services (e.g., QoS 1431, DHCP 1432 or NAT 1433). Although some of these functions may be required to be performed by some entity within the network, they are not required to be incorporated into the gateway 1440. In some exemplary embodiments, with respect to authorization, the gateway 1440 enforces the policy (obtained from the Home-AAA server 45) on the local network. Such policies may include, for example, QoS, Accounting parameters, and/or reauthentication times, or the like). Some embodiments include a dynamic rate limiting QoS mechanism to provide class of service and fairness in public 802.11 deployments/admission control to prevent backhaul overload, similar to that described above with reference to FIG. 7.

Additional IP and Web Services may include: Dynamic packet filter/firewall, HTTP redirection, DNS redirection/DNS proxy, NAT 1433, DHCP 1432, and/or Web Cache 1411, Local Portal 1413.

The HotSpot can be installed by simply applying power to the gateway—no additional wiring is needed.

In some embodiments, the gateway 1440 is responsible for initiating the connection 1423 over the wireless backhaul channel using configured information required for authentication such as network access identifier (NAI), password/shared secret, access point name (UMTS/GPRS), and a dial string required to establish the packet data channel via a PPP connection. The IP address used for this wireless backhaul channel 1223 may be statically configured or may be obtained dynamically from the wireless access network during the PPP negotiation.

When the IP address is obtained dynamically, the gateway 1440 autoconfigures itself, based on the obtained address, the foreign agent care of address for MobileIP mode of operation, and the address to NAT to, for SimpleIP mode of operation. Since the wireless backhaul channel 1423 may be lost depending on coverage and interference conditions, the gateway 1440 constantly monitors the status of the connection and re-establishes the connection if it is dropped. The gateway 1440 requests the IP address that it previously received in the last successful establishment of the channel.

However, the network may not be able to allocate the same IP address on re-establishment. In that case, the gateway again reconfigures itself to the newly obtained IP address. In the MobileIP mode of operation, the gateway then starts advertising the new foreign agent care of address, which appears to MobileIP clients as if they had moved to a new network with a different foreign agent, and reinvoked the MobileIP registration procedures. For SimpleIP mode of operation, the NAT reconfiguration will cause existing TCP and UDP flows to fail due to the IP address change. However, any new flows will be NATed to the new IP address and the subscriber will be able to continue the data session without reauthentication needed.

The gateway 1440 also obtains the local DNS server IP address upon establishment of the backhaul link. All DNS requests from clients can then be redirected to this optimal local DNS server by the gateway regardless of the clients prior DNS setting.

In some embodiments, the gateway 1440 may also support an ethernet backhaul connection using DHCP, using a similar autoconfiguration process as outlined above for the wireless backhaul case. In this instance, the gateway obtains the IP address and DNS server addresses dynamically by initiating a DHCP exchange on the connected local network.

Thus, the gateway 1440 supports a mobile mode of operation where it establishes a wireless data backhaul connection and autoconfigures to the obtained IP address and DNS IP address. Autoconfiguration also takes place on re-establishment of the back-haul channel after a failed or dropped connection. The autoconfiguration sets the necessary internal parameters for:

MobileIP foreign agent care of address and the subsequent agent advertisement care of address;
IP address used with the NAT function;
DNS server IP address for DNS query redirection; and
packet filter reconfiguration.

The autoconfiguration also establishes the backhaul connection and configures the foreign agent care of address based on the obtained parameters.

The present invention may be embodied in the form of computer-implemented processes and apparatus for practicing those processes. The present invention may also be embodied in the form of computer program code embodied in tangible media, such as floppy diskettes, read only memories (ROMs), CD-ROMs, hard drives, ZIP™ disks, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

We claim:

1. A gateway for mobile communications, comprising:
   a cache for storing network data recently downloaded from a network;
   a mobile IP foreign agent; and
   a packet filter that directs requests for the network data from a mobile node to the cache;
   the packet filter directing the requested network data from the cache to the mobile node by way of the foreign agent, without forwarding the requested network data to a home agent of the mobile node, wherein the packet filter performs network layer filtering and one of the group consisting of transport layer filtering and application layer filtering.

2. The gateway of claim 1, further comprising a storage device that stores a state of the mobile node, the state of the mobile node being updated in the storage device when the mobile node moves from the proximity of the gateway to the proximity of a second gateway having a second foreign agent,
   wherein the packet filter directs the requested network data from the cache to the mobile node by way of the second foreign agent, without forwarding the requested network data to the first foreign agent or a home agent of the mobile node, while the mobile node is in the proximity of the second gateway.

3. The gateway of claim 2, wherein the state of the mobile node in the storage device is updated in response to a message from the second gateway.

4. The gateway of claim 1, wherein the packet filter adds at least one packet-mangling rule to a set of firewall policies associated with the mobile node.

5. The gateway of claim 4, wherein the at least one packet-mangling rule is user-specific.

6. The gateway of claim 5, wherein the gateway has at least one port for coupling directly or indirectly to an 802.11 access point.

7. The gateway of claim 1, wherein the packet filter performs multi-level filtering.

8. A gateway for mobile communications, comprising:
   a cache for storing network data recently downloaded from a network;
   a foreign agent;
   means for directing requests for the network data from a mobile node to the cache; means for performing network layer filtering and one of the group consisting of transport layer filtering and application layer filtering; and
   means for directing the requested network data from the cache to the mobile node by way of the foreign agent, without forwarding the requested network data to a home agent of the mobile node.

9. The gateway of claim 8, further comprising a storage device that stores a state of the mobile node, the state of the mobile node being updated in the storage device when the mobile node moves from the proximity of the gateway to the proximity of a second gateway having a second foreign agent,
   wherein the data directing means directs the requested network data from the cache to the mobile node by way of the second foreign agent, without forwarding the requested network data to the first foreign agent or a home agent of the mobile node, while the mobile node is in the proximity of the second gateway.

10. The gateway of claim 9, wherein the state of the mobile node in the storage device is updated in response to a message from the second gateway.

11. The gateway of claim 8, wherein the request directing means includes a packet filter module that adds at least one packet-mangling rule to a set of firewall policies associated with the mobile node.

12. The gateway of claim 11, wherein the at least one packet-mangling rule is user-specific.

13. The gateway of claim 8, wherein the gateway has at least one port for coupling directly or indirectly to an 802.11 access point.

14. A method for mobile worldwide web access, comprising:
   caching network data recently downloaded from a network in a cache;
   directing, by a packet filter, requests for the network data from a mobile node to the cache; and
   directing, by a packet filter, the requested network data from the cache to the mobile node by way of a foreign agent collocated with the cache, without forwarding the requested network data to a home agent of the mobile node, while the mobile node is proximate to the cache wherein the packet filter performs network layer filtering and one of the group consisting of transport layer filtering and application layer filtering.

15. The method of claim 14, further comprising:
   storing a state of the mobile node at a first gateway that includes the cache;
   updating the state of the mobile node when the mobile node moves from the proximity of the first gateway to the proximity of a second gateway having a second foreign agent; and directing the requested network data from the cache to the mobile node by way of the second foreign agent, without forwarding the requested network data to the first foreign agent or a home agent of the mobile node, while the mobile node is in the proximity of the second gateway.

16. The method of claim 15, further comprising updating the state of the mobile node in response to a message from the second gateway.

17. A computer readable medium encoded with computer program code, wherein, when the code is executed by a processor, the processor performs a method for mobile communications, comprising:
- caching network data recently downloaded from a network in a cache;
- directing, by a packet filter, requests for the network data from a mobile node to the cache; and
- directing, by a packet filter, the requested network data from the cache to the mobile node by way of a foreign agent collocated with the cache, without forwarding the requested network data to a home agent of the mobile node, while the mobile node is proximate to the cache wherein the packet filter performs network layer filtering and one of the group consisting of transport layer filtering and application layer filtering.

18. The computer readable medium of claim 17, wherein the method further comprises:
- storing a state of the mobile node at a first gateway that includes the cache;
- updating the state of the mobile node when the mobile node moves from the proximity of the first gateway to the proximity of a second gateway having a second foreign agent; and
- directing the requested network data from the cache to the mobile node by way of the second foreign agent, without forwarding the requested network data to the first foreign agent or a home agent of the mobile node, while the mobile node is in the proximity of the second gateway.

19. The computer readable medium of claim 18, wherein the method further comprises updating the state of the mobile node in response to a message from the second gateway.

* * * * *